(12) United States Patent
Otsubo et al.

(10) Patent No.: US 11,575,825 B2
(45) Date of Patent: Feb. 7, 2023

(54) CONTROL APPARATUS, CONTROL SYSTEM, AND CONTROL PROGRAM

(71) Applicant: NIKON CORPORATION, Tokyo (JP)

(72) Inventors: Yosuke Otsubo, Tokyo (JP); Satoshi Takahashi, Yokohama (JP); Yuuya Takayama, Foster City, CA (US); Kazuhiro Abe, Yokohama (JP); Hideo Hoshuyama, Kawasaki (JP); Marie Shoda, Gyoda (JP); Sho Somiya, Yokohama (JP); Tetsuya Koike, Yamato (JP); Naoya Otani, Yokohama (JP)

(73) Assignee: NIKON CORPORATION, Tokyo (JP)

( * ) Notice: Subject to any disclaimer, the term of this patent is extended or adjusted under 35 U.S.C. 154(b) by 254 days.

(21) Appl. No.: 16/756,882

(22) PCT Filed: Oct. 17, 2018

(86) PCT No.: PCT/JP2018/038651
§ 371 (c)(1),
(2) Date: Jul. 20, 2020

(87) PCT Pub. No.: WO2019/078248
PCT Pub. Date: Apr. 25, 2019

(65) Prior Publication Data
US 2021/0203837 A1  Jul. 1, 2021

(30) Foreign Application Priority Data

Oct. 17, 2017  (JP) .............................. JP2017-201190

(51) Int. Cl.
*H04N 5/232* (2006.01)
*H04N 5/262* (2006.01)
(Continued)

(52) U.S. Cl.
CPC ......... *H04N 5/23219* (2013.01); *G06V 20/42* (2022.01); *G06V 20/46* (2022.01); *G06V 40/10* (2022.01); *H04N 5/247* (2013.01)

(58) Field of Classification Search
CPC .......................... H04N 5/23218; H04N 5/262
(Continued)

(56) References Cited

U.S. PATENT DOCUMENTS

2005/0046626 A1 * 3/2005 Yoda ....................... G06T 15/30
345/419
2017/0024609 A1   1/2017 Nishikawa et al.
(Continued)

FOREIGN PATENT DOCUMENTS

JP       2008-5208 A    1/2008
JP    2017-188715 A   10/2017

OTHER PUBLICATIONS

Sep. 8, 2021 Extended Search Report issued in European Patent Application No. 18867732.2.

*Primary Examiner* — Anthony J Daniels
(74) *Attorney, Agent, or Firm* — Oliff PLC

(57) ABSTRACT

A control apparatus that access first cameras capturing a first subject of a first area, and second cameras capturing a second subject of a second area, detects a viewing direction of a spectator group in the first subject on the basis of image data of the first subject captured by any one of first cameras, identifies a focus area in the second area that is focused on by the spectator group on the basis of the viewing direction of the spectator group, identifies a focus subject, focused on by the spectator group, that is present in the focus area on the basis of image data of the second subject captured by each of the second cameras, determines a specific second camera to be a transmission source of image data from among the
(Continued)

second cameras on the basis of the focus subject, and transmits image data from the specific second camera.

13 Claims, 22 Drawing Sheets

(51) Int. Cl.
*H04N 5/247* (2006.01)
*G06V 20/40* (2022.01)
*G06V 40/10* (2022.01)

(58) Field of Classification Search
USPC .................................................. 348/207.99
See application file for complete search history.

(56) References Cited

U.S. PATENT DOCUMENTS

2017/0322017 A1* 11/2017 Aoki .................. H04N 5/23218
2018/0077345 A1* 3/2018 Yee .................... H04N 5/23206
2018/0350136 A1* 12/2018 Rowley ................. G06F 3/012
2019/0043218 A1* 2/2019 Hiltner ...................... G01S 5/16

* cited by examiner

CONTROL APPARATUS, CONTROL SYSTEM, AND CONTROL PROGRAM

CLAIM OF PRIORITY

The present application claims priority from Japanese patent application JP 2017-201190 filed on Oct. 17, 2017, the content of which is hereby incorporated by reference into this application.

BACKGROUND

The present invention pertains to a control apparatus, a control system, and a control program.

JP 2008-5208 A discloses a camera automatic control system, a camera automatic control method, a camera automatic control apparatus, and a program used in imaging sporting events and the like. However, in JP 2008-5208 A, sporting event imaging cameras are switched according to a switching instruction from an operator. In other words, switching of cameras for television broadcasting continues to be performed according to instructions from a responsible person referred to as a director, and thus, the document does not consider automation of switching.

SUMMARY

An aspect of the disclosure of a control apparatus in this application is configured to be accessible a plurality of first cameras that capture a first subject of a first area in a facility, and a plurality of second cameras that capture a second subject of a second area in the facility, the control apparatus comprising: a detection unit configured to detect a viewing direction of a spectator group in the first subject on the basis of image data of the first subject captured by any one of the plurality of first cameras;

an identification unit configured to identify a focus area in the second area that is focused on by the spectator group on the basis of the viewing direction of the spectator group detected by the detection unit, and identify a focus subject, focused on by the spectator group, that is present in the focus area on the basis of image data of the second subject captured by each of the plurality of second cameras; a determination unit configured to determine a specific second camera to be a transmission source of image data from among the plurality of second cameras on the basis of the focus subject identified by the identification unit; and a transmission unit configured to transmit image data from the specific second camera determined by the determination unit.

Another aspect of the disclosure of a control apparatus in this application is a control apparatus configured to be accessible a first camera that captures a first subject of a first area in a facility, and a second camera that captures a second subject of a second area in the facility, the control apparatus comprising: a detection unit configured to detect a viewing direction of a spectator group in the first subject on the basis of image data of the first subject captured by the first camera; an identification unit configured to identify a focus area in the second area that is focused on by the spectator group on the basis of the viewing direction of the spectator group detected by the detection unit; and a control unit configured to control imaging performed by the second camera on the basis of identification results by the identification unit.

An aspect of the disclosure of a control system in this application comprises: a plurality of first cameras that capture a first subject of a first area in a facility; a plurality of second cameras that capture a second subject of a second area in the facility; and a control apparatus configured to be accessible the plurality of first cameras and the plurality of second cameras, wherein the control apparatus includes: a detection unit configured to detect a viewing direction of a spectator group in the first subject on the basis of image data of the first subject captured by any one of the plurality of first cameras; an identification unit configured to identify a focus area in the second area that is focused on by the spectator group on the basis of the viewing direction of the spectator group detected by the detection unit, and identify a focus subject, focused on by the spectator group, that is present in the focus area on the basis of image data of the second subject captured by each of the plurality of second cameras; a determination unit configured to determine a specific second camera to be a transmission source of image data from among the plurality of second cameras on the basis of the focus subject identified by the identification unit; and a transmission unit configured to transmit image data from the specific second camera determined by the determination unit.

An aspect of the disclosure of a control program in this application causes a processor configured to be accessible a plurality of first cameras that capture a first subject of a first area in a facility, and a plurality of second cameras that capture a second subject of a second area in the facility, to execute: a detection process of detecting a viewing direction of a spectator group in the first subject on the basis of image data of the first subject captured by any one of the plurality of first cameras; an identification process of identifying a focus area in the second area that is focused on by the spectator group on the basis of the viewing direction of the spectator group detected by the detection process, and identifying a focus subject, focused on by the spectator group, that is present in the focus area on the basis of image data of the second subject captured by each of the plurality of second cameras; a determination process of determining a specific second camera to be a transmission source of image data from among the plurality of second cameras on the basis of the focus subject identified by the identification process; and a transmission process of transmitting image data from the specific second camera determined by the determination process.

Another aspect of the disclosure of a control program in this application causes a processor configured to be accessible a first camera that captures a first subject of a first area in a facility, and a second camera that captures a second subject of a second area in the facility, to execute: a detection process of detecting a viewing direction of a spectator group in the first subject on the basis of image data of the first subject captured by the first camera; an identification process of identifying a focus area in the second area that is focused on by the spectator group on the basis of the viewing direction of the spectator group detected by the detection process; and a control process of controlling imaging performed by the second camera on the basis of identification results by the identification process.

DETAILED DESCRIPTION OF THE EMBODIMENT

Configuration Example of Control System

Figure 1:
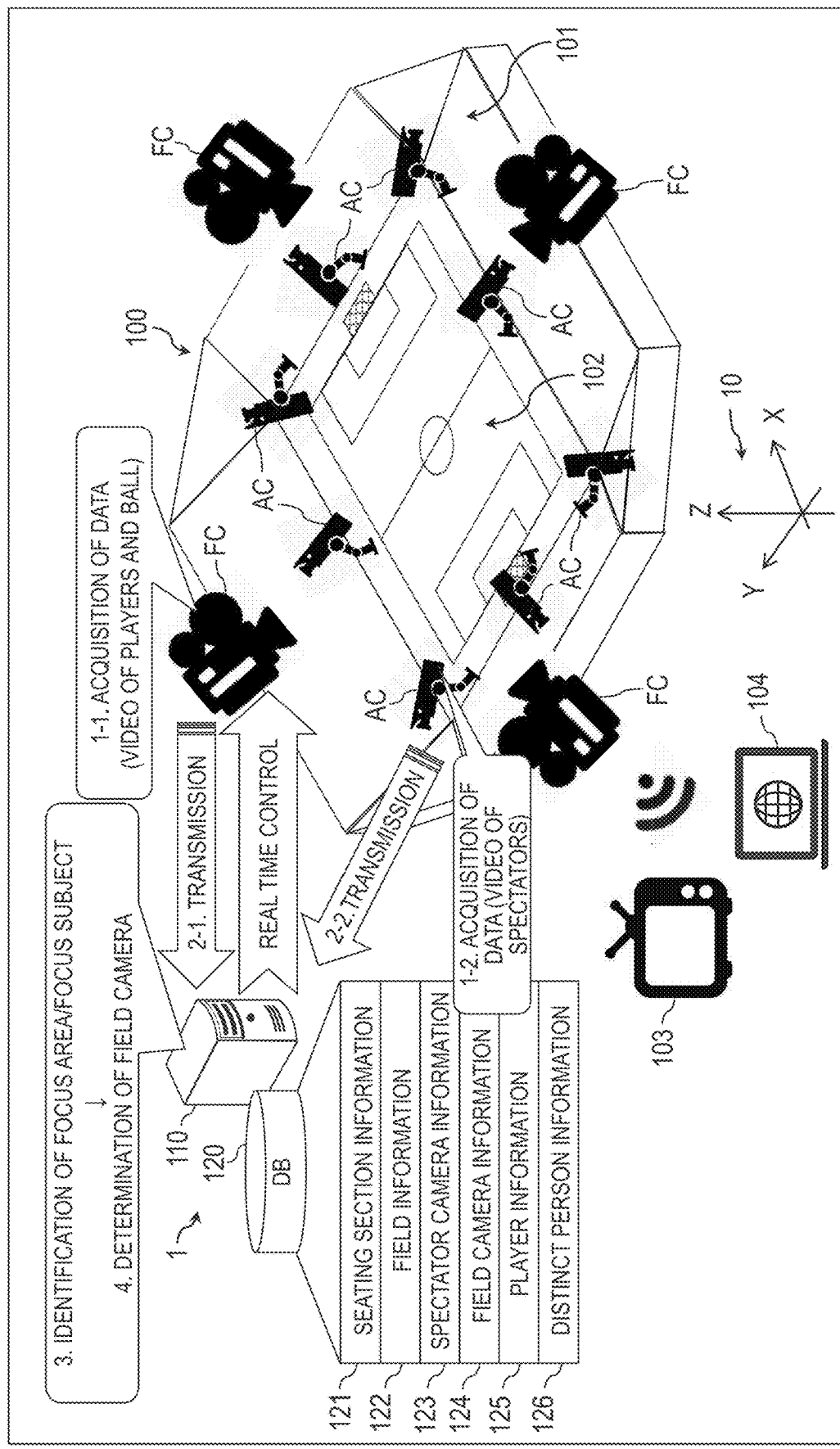
FIG. 1 is a descriptive view showing a configuration example of a control system.

FIG. 1 is a descriptive view showing a configuration example of a control system. A control system 1 of the present embodiment is a system that automatically switches between scenes of image data broadcasted on television or over the internet according to the line of sight of spectators. This control system 1 is a system installed in a facility, for example. The facility is a building or location where the spectators view the focus subject, and includes stadiums, arenas, event halls, gymnasiums, athletic grounds, sports grounds, pools, theaters, and theme parks, for example. In the present embodiment, a soccer stadium 100 is given as an example.

The facility has a first area where spectators are present and a second area where the focus subjects are present. In the case of a soccer stadium 100, the first area is a seating section 101 and the second area is a field 102. The focus subject is a person or object to be viewed by the spectators, and in the case of soccer, for example, where the focus subjects refer to people, the focus subjects are the players, the coaches, and the referees, and where the focus subject refers to an object, the focus subject is the ball.

A control system 1 has a plurality of spectator cameras AC, a plurality of field cameras FC, a control apparatus 110, and a database. The spectator cameras AC are cameras that shoot video of the seating section 101, which is the first area. The field cameras FC are cameras that shoot video of the field 102 of the stadium 100. The field camera FC may automatically track the subjects or may be operated by the videographer.

Image data from the spectator cameras AC and the field cameras FC is transmitted to the control apparatus 110. The image data from the field cameras FC is distributed to general household televisions 103 via a broadcast tower, or to personal computers 104 (including smartphones and tablets) via the internet.

A control apparatus 110 is a computer that can communicate with the plurality of spectator cameras AC, the plurality of field cameras FC, and a database 120. The database 120 stores, as design information pertaining to the facility, seating section information 121, field information 122, spectator camera information 123, and field camera information 124. Also, the database 120 stores player information 125 and distinct person information 126. The database 120 may be provided outside of the control system 1 as long as it can be accessed from the control apparatus 110.

The seating section information 121 is information indicating 3-dimensional positions of seats in the seating section 101 in the facility according to a local coordinate system 10 including an X axis, a Y axis, and a Z axis, which are orthogonal to each other. The plane formed by the X axis and the Y axis is a plane parallel to the field 102, and the Z axis indicates the height from the field 102.

The field information 122 is information indicating 3-dimensional positions on the field 102 in the facility. The spectator camera information 123 is information indicating 3-dimensional positions and imaging conditions of the spectator cameras AC in the facility. Imaging conditions include the imaging direction, the angle of view, and the magnification, for example. The field camera information 124 is information indicating 3-dimensional positions and imaging conditions of the field cameras FC in the facility.

The player information 125 is information indicating the team to which the player belongs, the color and pattern of the uniform, and the jersey number. Facial image data of the player may also be included. The distinct person information 126 is information indicating a distinct person, and specifically includes facial image data of the person and image data of the apparel worn by the person, for example.

Here, the operations of the control system 1 will be described.

(1-1) The field cameras FC image the players and the ball on the field 102 and acquire image data.

(1-2) The spectator cameras AC image the spectator group in the seating section 101 and acquire image data.

(2-1) The field cameras FC transmit the acquired image data to the control apparatus 110.

(2-2) The spectator cameras AC transmit the acquired image data to the control apparatus 110.

(3) The control apparatus 110 uses the acquired image data to identify the area (hereinafter, "focus area") of the field 102 being focused on by the spectator group, and identifies the focus subject (players and/or ball) present in the focus area with reference to the database 120.

(4) The control apparatus 110 determines the field camera FC, from among the plurality of field cameras FC, with which to image the identified focus subject. The control apparatus 110 specifically determines the optimal field camera FC to which to switch according to whether the positional relationship and distance between the focus area and the field camera FC and the continuous broadcast time of a single field camera FC exceed thresholds, and whether the face of the player can be recognized.

As a result, image data from the determined field camera FC is broadcasted or distributed to the television 103 or the personal computer 104. Thus, switching of the field cameras FC can be automated (real time control).

Hardware Configuration Example of Monitoring Apparatus

Figure 2:
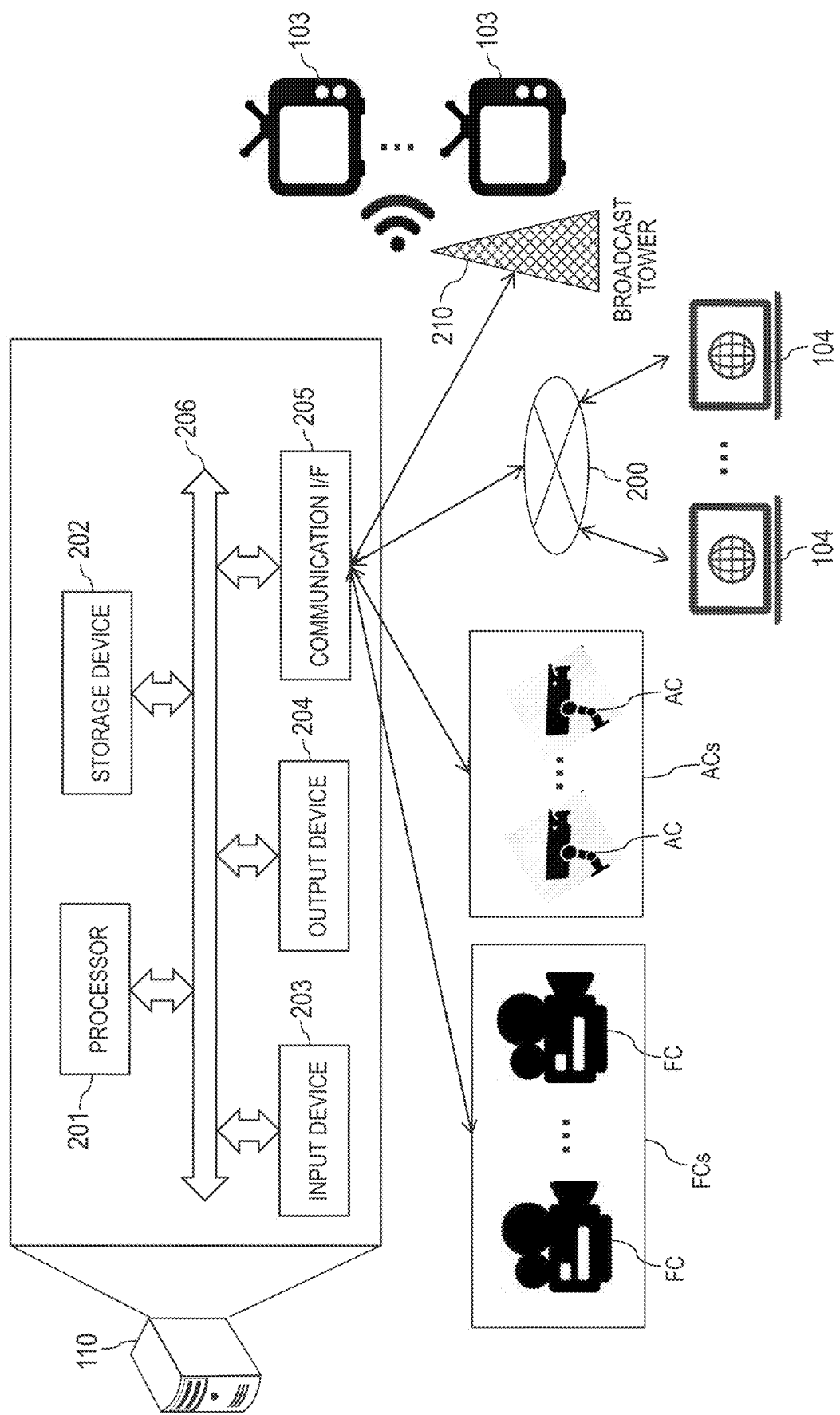
FIG. 2 is a block diagram illustrating a hardware configuration ex ample of the control apparatus.

FIG. 2 is a block diagram illustrating a hardware configuration ex ample of the control apparatus 110. The control apparatus 110 includes a processor 201, a storage device 202, an input device 203, an output device 204, and a communication interface (communication IF) 205. The processor 201, the storage device 202, the input device 203, the output device 204, and the communication IF 205 are connected to one another by a bus 206.

The processor 201 controls the control apparatus 110. The storage device 202 serves as a work area of the processor 201. The storage device 202 is a recording medium which stores various programs and da ta. The storage device 202 can be, for example, a read-only memory (RO M), a random-access memory (RAM), a hard disk drive (HDD), or a flash memory.

The input device 203 inputs data. The input device 203 can be, for example, a keyboard, a mouse, a touch panel, a ten-key pad, or a scanner. The output device 204 outputs data. The output device 204 can be, for example, a display or a printer.

The communication I/F 205 receives the image data from the spectator camera group ACs and the field camera group FCs. Also, the communication I/F 205 is connected to the internet 200 and a broadcast tower 210, and image data received from a spectator camera group ACs and a field camera group FCs is transmitted to the personal computer 104 and the television 103.

Functional Configuration Example of Control Apparatus 110

Figure 3:
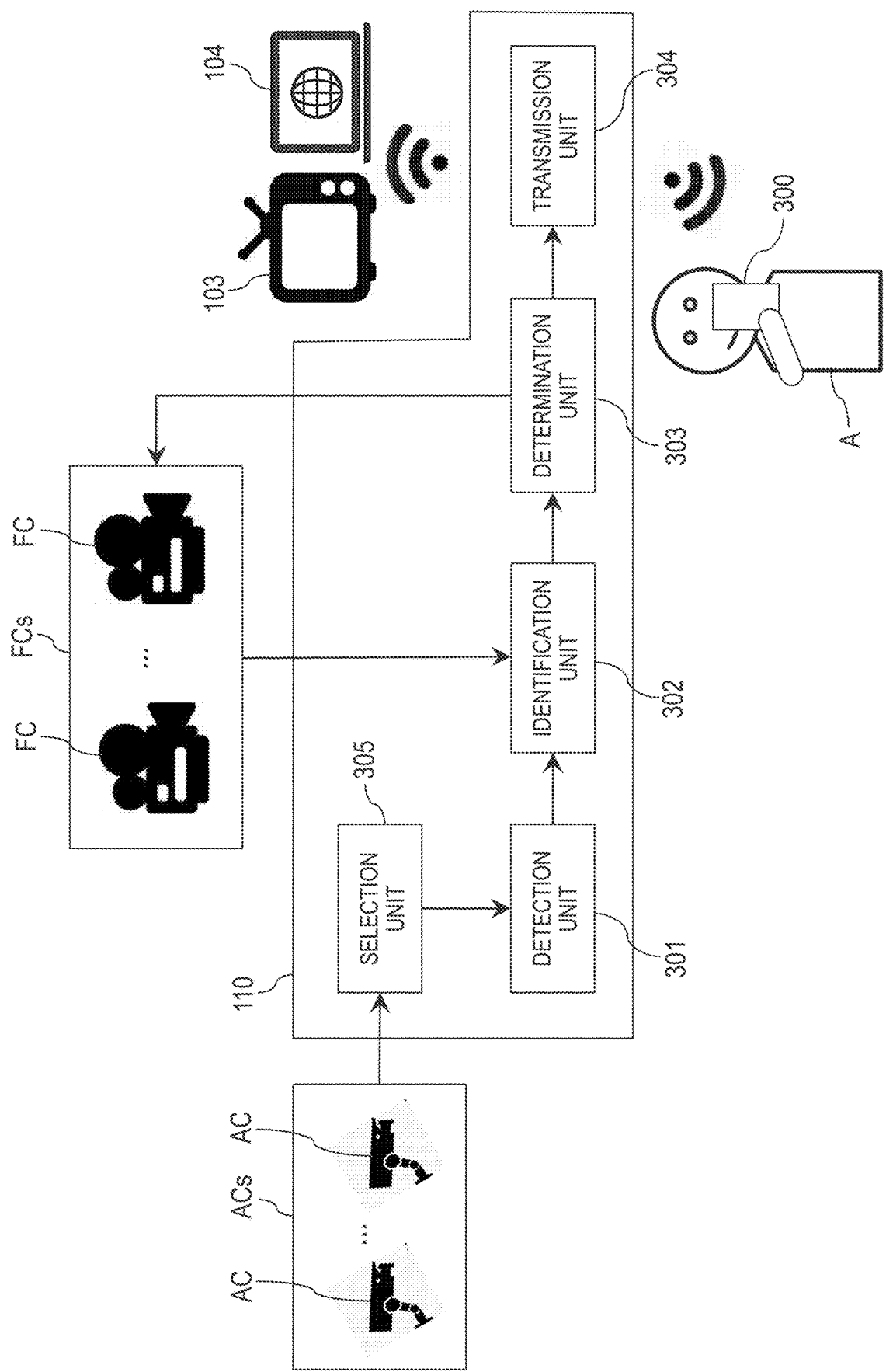
FIG. 3 is a block diagram showing a functional configuration example of the control apparatus.

FIG. 3 is a block diagram showing a functional configuration example of the control apparatus 110. The control apparatus 110 has a detection unit 301, an identification unit 302, a determination unit 303, a transmission unit 304, and a selection unit 305. The above consecutive components from the detection unit 301 to the selection unit 305 specifically are functions realized by a processor 201 executing programs stored in a storage device 202 shown in FIG. 2, for example.

The detection unit 301 detects the viewing direction of the spectator group in a first subject on the basis of image data of the first subject captured by any of the spectator cameras AC in the spectator camera group ACs. The viewing direction of the spectator group is a direction indicating a resultant vector of the viewing directions of individual spectators within the spectator group.

That is, if the scalar value of the resultant vector is greater than or equal to a predetermined value, this indicates that a large portion of the spectator group is looking at the field 102 in the direction of the resultant vector. Detection of the eye region is one method for detecting the viewing direction of individual spectators. The detection unit 301 detects the viewing direction by detecting the position of the irises in the eye region in the image data where the spectators appear. Alternatively, the detection unit 301 may detect the viewing direction of the spectators according to the direction of the faces of the spectators.

The identification unit 302 identifies the focus area in the second area by the spectator group on the basis of the viewing direction of the spectator group detected by the detection unit 301. Specifically, for example, the identification unit 302 identifies a focus area in the field 102 at the end of the viewing direction of the spectator group according to the seating section information 121 and the field information 122 in the database 120. In other words, an area in the field 102 at the end of the viewing direction starting at the position of the seating section 101 of the spectator group is the focus area. The focus area is an area encompassing points where the extension lines of the viewing directions intersect with the field 102.

Also, the identification unit 302 identifies the focus subject of the spectator group present within the focus area on the basis of image data of the second subject captured by each of the field cameras FC in the field camera group FCs. Specifically, for example, the identification unit 302 identifies the focus subject in the focus area captured by the field cameras FC from image data from the field cameras FC.

If the spectator camera AC is a so-called omnidirectional camera, then the spectator camera AC images the seating section 101 and the field 102 on the opposite side to the spectator camera 101. Thus, the control apparatus 110 uses the image data from the spectator cameras AC to directly identify the focus subject present on the extension line of the viewing direction of the spectator group. As a result, there is no need to use image data from the field cameras FC to identify the focus subject, and it is possible to improve identification accuracy for focus subject and improve processing speed.

The determination unit 303 determines a specific field camera FC to be the transmission source of image data from among the field camera group FCs on the basis of the focus subject identified by the identification unit 302. Specifically, for example, the determination unit 303 determines the optimal field camera FC to which to switch according to whether the positional relationship and distance between the focus area and the field camera FC and the continuous broadcast time of a single field camera FC exceed thresholds, and whether the face of the player can be recognized.

As a result, image data from the determined field camera FC is broadcasted or distributed to the television 103 or the personal computer 104. Thus, switching of the field cameras FC can be automated.

The transmission unit 304 transmits image data from a specific field camera FC determined by the determination unit 303. Specifically, for example, the transmission unit 304 uses the communication I/F to transmit image data from the specific field camera FC to general household televisions 103 via a broadcast tower 210, or to personal computers 104 (including smartphones and tablets) via the internet 200.

The selection unit 305 selects a specific spectator camera AC from among the spectator camera group ACs prior to detecting the viewing direction. Specifically, for example, the selection unit 305 selects a specific spectator camera AC from among a plurality of spectator cameras AC on the basis of a score indicating the number of people in the spectator group in the first subject captured by each of the plurality of spectator cameras AC. The score indicates the number of people in the spectator group, and specifically indicates the proportion of the area in one frame of the image data taken up by image data of the spectators, or in other words, the density. The greater the score is, the greater the number of spectators is.

The selection of the spectator camera AC by the selection unit 305 is for the purpose of detecting the viewing direction of a large number of spectators by the detection unit 301. Thus, imaging conditions of the spectator cameras AC are set such that a predetermined number of seats or greater within the seating section 101 fall within the angle of view of the spectator camera AC as the first subject. The detection unit 301 detects the viewing direction of the spectator group in the first subject on the basis of image data of the first subject captured by the spectator camera AC selected by the selection unit 305.

Also, the selection unit 305 selects a specific spectator camera AC on the basis of the positional relationship between the spectator group and the focus area. Specifically, for example, the selection unit 305 selects, as the specific spectator camera AC, a spectator camera AC, which images the spectator group, that is the closest to the focus area among the plurality of spectator cameras AC. Details regarding the selection will be mentioned later with reference to FIG. 4-6.

Also, the selection unit 305 selects, as the specific spectator camera AC, a spectator camera AC for which the score is greater than or equal to a predetermined threshold. The higher the score of the spectator camera AC is, the more spectators are captured by the spectator camera AC, and thus, such a spectator camera AC is suited to detecting the viewing direction of the spectator group. Therefore, the selection unit 305 should select the spectator camera AC with a high absolute score among the plurality of spectator cameras AC, or in other words, the spectator camera AC with a score greater than or equal to the threshold.

If there are a plurality of spectator cameras AC having a score greater than or equal to the predetermined threshold, the selection unit 305 may select the spectator camera AC with the highest score. Also, the spectator camera AC to be selected may be limited to one that satisfies conditions of the specific spectator camera AC according to the above-mentioned positional relationship between the seating section 101 and the focus area.

Also, the selection unit 305 selects, as the specific spectator camera AC, a spectator camera AC with a relatively high score among the plurality of spectator cameras AC. The higher the score of the spectator camera AC is, the more spectators are captured by the spectator camera AC, and thus, such a spectator camera AC is suited to detecting the viewing direction of the spectator group. Thus, the selection unit 305 should select the spectator camera AC with a high relative score among the plurality of spectator cameras AC.

If there are a plurality of spectator cameras AC having a relatively high score, the selection unit 305 may select the spectator camera AC with the highest score. Also, the spectator camera AC to be selected may be limited to one that satisfies conditions of the specific spectator camera AC according to the above-mentioned positional relationship between the seating section 101 and the focus area.

Alternatively, the selection unit 305 may select, as the specific spectator camera AC, a spectator camera AC for which the score is less than the predetermined threshold. The higher the score of the spectator camera AC is, the more spectators are captured by the spectator camera AC, and thus, such a spectator camera AC is suited to detecting the viewing direction of the spectator group. However, if there are no scores greater than or equal to the threshold, a spectator camera AC with a score less than the threshold is used. If there are a plurality of spectator cameras AC having a score less than the predetermined threshold, the selection unit 305 may select the spectator camera AC with the highest score.

Also, the spectator camera AC to be selected may be limited to one that satisfies conditions of the specific spectator camera AC according to the above-mentioned positional relationship between the seating section 101 and the focus area. Alternatively, the selection unit 305 may be configured so as to typically select a spectator camera AC with a score that is greater than or equal to the threshold and randomly or periodically select a spectator camera AC for which the score is less than the threshold. As a result, it is possible to take into consideration the viewing direction of a minority of spectators and switch the field camera FC to a scene that might be missed by the majority of spectators, for example.

Also, the selection unit 305 selects, as the specific spectator camera AC, a spectator camera AC with a relatively low score among the plurality of spectator cameras AC. If there are a plurality of spectator cameras AC having a relatively low score, the selection unit 305 may select the spectator camera AC with the lowest score. Also, the spectator camera AC to be selected may be limited to one that satisfies conditions of the specific spectator camera AC according to the above-mentioned positional relationship between the seating section 101 and the focus area.

Alternatively, the selection unit 305 may be configured so as to typically select a spectator camera AC with a score that is not the lowest score and randomly or periodically select a spectator camera AC with a relative low score. As a result, it is possible to take into consideration the viewing direction of a minority of spectators and switch the field camera FC to a scene that might be missed by the majority of spectators, for example.

Also, if a spectator camera AC with a score that is less than the threshold or that is relatively low is selected as the specific spectator camera AC, the detection unit 301 may detect the viewing direction of a specific spectator as opposed to the viewing direction of the spectator group captured by the specific spectator camera AC. If the score is less than the threshold or relatively low, then there are few spectators, and thus, the viewing direction of the spectator group is sometimes not the direction that the spectator group as a whole wishes to view. Thus, in such a case, the detection unit 301 narrows down the spectator group by eliminating noise.

In this case, noise includes spectators who are engaging in inattentive behavior such as spectators who are using their smartphones or eating (in either case, looking down), or are looking in the direction of an electronic billboard. The detection unit 301 eliminates spectators with such viewing directions, and detects the viewing direction of specific spectators from among the remaining the spectator group. Also, the detection unit 301 may select a distinct person as the specific spectator and detect their viewing direction with reference to the database 120.

Also, if a spectator camera AC with a score that is less than the threshold or that is relatively low is selected as the specific spectator camera AC, the detection unit 301 may detect the viewing direction of a specific spectator on the basis of the imaging direction of the specific field camera FC determined by the determination unit 303 and the viewing direction of each individual among a specific spectator group.

Image data from the specific field camera FC is viewed by viewers of the television 103, and thus, the imaging direction of the specific field camera FC is the viewing direction of the viewer of the television 103. Therefore, the detection unit 301 may detect the viewing direction of each spectator among the spectator group positioned in the opposite direction to the imaging direction and detect the viewing direction from a specific spectator within the spectator group.

The viewing direction of the specific spectator in this case may be a direction that is the same as the imaging direction or similar thereto within an allowable range. As a result, it is possible to provide footage to be viewed by both viewers of the television 103 and spectators. The viewing direction of the specific spectator may be a direction that outside of the allowable range from the imaging direction. As a result, it is possible to switch the field camera FC to a focus subject that cannot be viewed by a viewer of the television 103.

Also, the control apparatus 110 may switch to a field camera FC, among the field camera group FCs, that captures image data most similar to past broadcast data. In this case, the control apparatus 110 detects a vector tying the spectator camera AC to the subject as the viewing direction of the spectators. It is possible to improve detection accuracy on the basis of the detection of this viewing direction.

Also, the transmission unit 304 may transmit still image data captured by the field camera FC to a communication terminal 300 (such as a smartphone) of at least one spectator A among the spectator group that is the source of the switching of the field camera FC. In this case, the control apparatus 110 stores, in the database, address information (electronic mail address, for example) of the communication terminal 300 of the spectator. The still image data may be data captured as a still image by the field camera FC or may be data extracted from the image data.

Alternatively, the transmission unit 304 may transmit to the communication terminal 300 not the still image data itself but access information (such as a URL) indicating the location where the still image data is stored. A decisive scene may occur immediately after switching field cameras FC, and thus, it is possible to provide still image data or access information for the time when the scene occurred to any spectators who are likely to have seen the scene. In particular, when such scenes occur, the spectators would be paying attention to the focus subject without photographing it, and thus, according to the above configuration, it is possible to acquire still image data of the focus subject that the spectators are viewing even if the spectators are not able to capture the still image data.

In the above embodiment, an example was described in which the control apparatus 110 switches between the plurality of field cameras FC, but the control apparatus 110 may instead identify a focus area R using image data of one or more spectator cameras AC or identify a focus subject in the focus area R, and control one field camera FC. The control unit that controls the field camera FC performs control such that the field camera FC faces the direction of the identified focus area R or the direction of the focus subject in the identified focus area R, for example.

Spectator Group Imaged by Spectator Cameras AC

Figure 4:
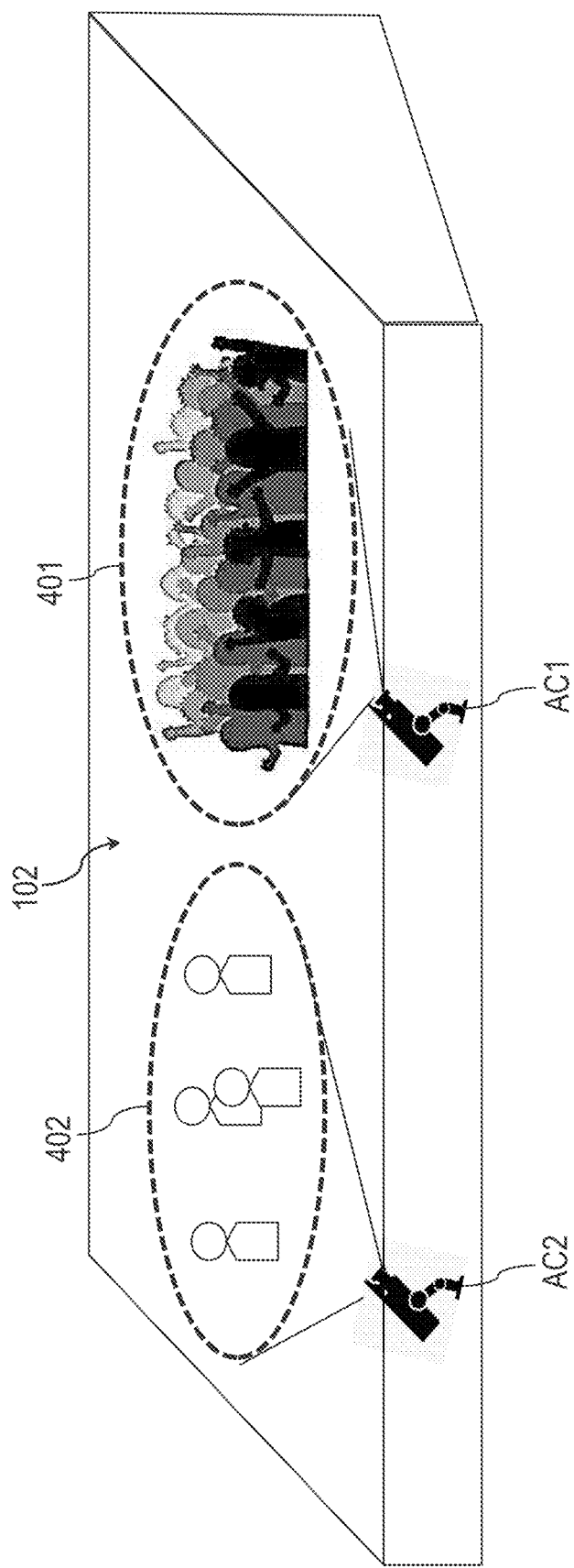
FIG. 4 is a descriptive view showing an example of spectator groups imaged by the spectator cameras.

FIG. 4 is a descriptive view showing an example of spectator groups imaged by the spectator cameras AC. In FIG. 4, the spectator cameras AC1 and AC2 have the same imaging conditions. The spectator camera AC1 images a spectator group 401 in the seating section 101, and the spectator camera AC2 images a spectator group 402 in the seating section 101. The number of people in the spectator groups 401 and 402 is identified by calculating the score in the above-mentioned selection unit 305.

In the example of FIG. 4, the score of the spectator group 401 is a score that is greater than or equal to the threshold or is relatively high, and the detection unit 301 detects, as the viewing direction of the spectator group 401, the resultant vector of the viewing direction vectors of the respective spectators in the spectator group 401. The score of the spectator group 402 is a score that is less than the threshold or is relatively low, and the detection unit 301 detects the viewing direction of a specific spectator in the spectator group 402.

Positional Relationship Between Spectators and Players

Next, the positional relationship between the spectators and the players will be described. The seating section 101 is located around the field 102. When the spectators visually track the focus subject (players and ball) on the field 102, the control apparatus 110 has trouble tracking dynamic changes in the viewing direction of the spectators and movement in the far side from the spectators, while being able to easily track movement in the left-right direction, which is perpendicular to the viewing direction, and movement on the close side towards the spectators. The ease with which the viewing direction can be tracked is referred to as sensitivity. Thus, the sensitivity for tracking of dynamic changes in the viewing direction of the spectators and movement in the far side from the spectators is low, while the sensitivity for tracking of movement in the left-right direction perpendicular to the viewing direction and movement on the close side towards the spectators is high.

Regarding FIGS. 5 to 7, descriptions will be made with one given spectator as an example, but the descriptions also similarly apply to spectator groups, which are gatherings of a plurality of spectators.

Figure 5:
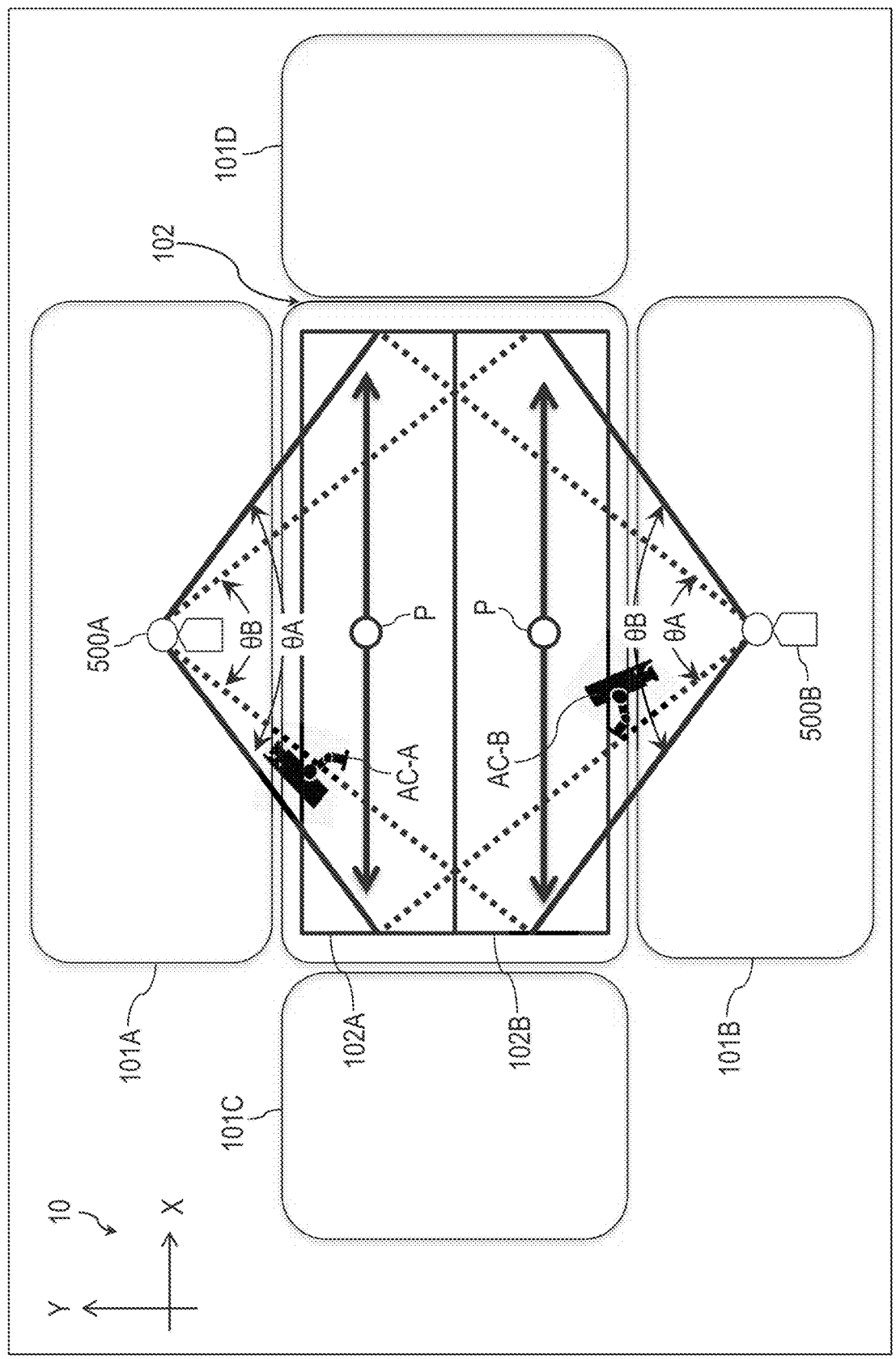
FIG. 5 is a descriptive view showing a sensitivity example 1 regarding dynamic changes in the viewing direction of the spectator.

FIG. 5 is a descriptive view showing a sensitivity example 1 regarding dynamic changes in the viewing direction of the spectator. Among the seating sections 101A to 101D surrounding the field 102, a spectator 500A is located in the seating section 101A and a spectator 500B is located in the seating section 101B. The seating section 101A is located opposite the seating section 101B.

Also, in the field 102, areas in which a player P moves in the X direction are areas 102A and 102B. The area 102A is an area closer to the seating section 101A than to the seating section 101B, and the area 102B is an area closer to the seating section 101B than to the seating section 101B.

In FIG. 5, the maximum viewing angle of the spectator 500A when the player P is present in the area 102A is $\theta A$, and the maximum viewing angle of the spectator 500A when the player P is present in the area 102B is $\theta B$ ($<\theta A$). Thus, a change in viewing direction by the spectator 500A resulting from movement of the player P in the X direction is more easily attained when the player P is located in the area 102A than when the player P is located in the area 102B. As a result, the detection unit 301 can detect, with a high degree of sensitivity, the viewing direction of the spectator 500A.

Similarly, a change in viewing direction by the spectator 500B resulting from movement of the player P in the X direction is more easily attained when the player P is located in the area 102B than when the player P is located in the area 102A. Thus, the detection unit 301 can detect, with a high degree of sensitivity, the viewing direction of the spectator 500A. Also, a change in viewing direction by both the spectators 500A and 500B is difficult to attain for Y direction movement by the player P. In other words, the detection sensitivity for the viewing direction is worse than for the X direction.

Therefore, when the player P is in the area 102A, it is preferable that the selection unit 305 select a spectator camera AC-A, which captures the seating section 101A, and when the player P is in the area 102B, it is preferable that the selection unit 305 select a spectator camera AC-B, which captures the seating section 101B.

Figure 6:
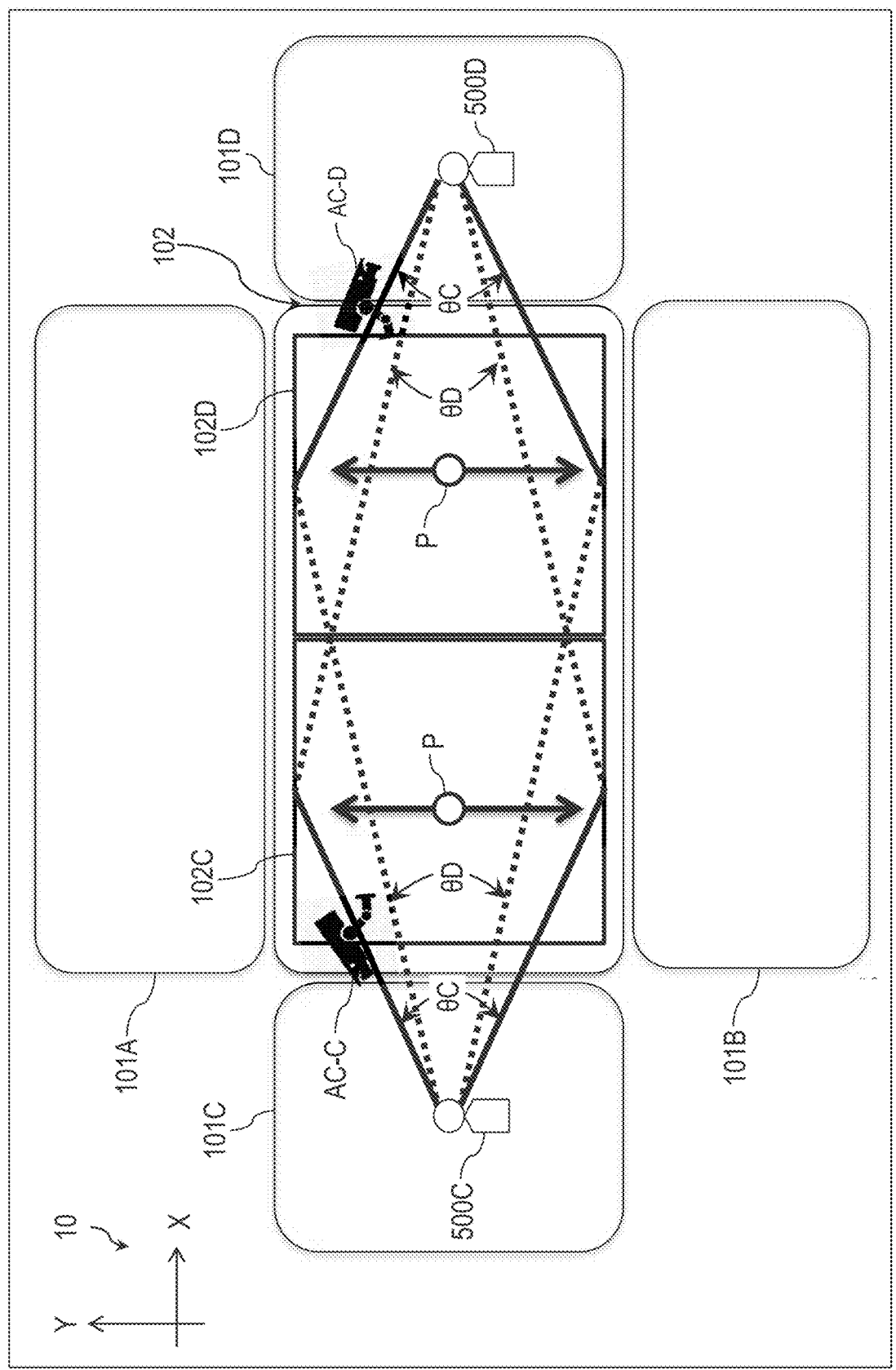
FIG. 6 is a descriptive view showing a sensitivity example 2 regarding dynamic changes in the viewing direction of the spectator.

FIG. 6 is a descriptive view showing a sensitivity example 2 regarding dynamic changes in the viewing direction of the spectator. Among the seating sections 101A to 101D surrounding the field 102, a spectator 500C is located in the seating section 101C and a spectator 500D is located in the seating section 101D. Also, the seating section 101C is located opposite the seating section 101D.

Also, in the field 102, areas in which a player P moves in the Y direction are areas 102C and 102D. The area 102C is an area closer to the seating section 101C than to the seating section 101D, and the area 102D is an area closer to the seating section 101D than to the seating section 101C. In FIG. 6, the maximum viewing angle of the spectator 500C when the player P is present in the area 102C is θC, and the maximum viewing angle of the spectator 500C when the player P is present in the area 102D is θD (<θA). Thus, a change in viewing direction by the spectator 500C resulting from movement of the player P in the Y direction is more easily attained when the player P is located in the area 102C than when the player P is located in the area 102D. As a result, the detection unit 301 can detect, with a high degree of sensitivity, the viewing direction of the spectator 500C.

Similarly, a change in viewing direction by the spectator 500D resulting from movement of the player P in the Y direction is more easily attained when the player P is located in the area 102D than when the player P is located in the area 102C. Thus, the detection unit 301 can detect, with a high degree of sensitivity, the viewing direction of the spectator 500C. Also, a change in viewing direction by both the spectators 500C and 500D is difficult to attain for X direction movement by the player P. In other words, the detection sensitivity for the viewing direction is worse than for the Y direction.

Therefore, when the player P is in the area 102C, it is preferable that the selection unit 305 select a spectator camera AC-C, which captures the seating section 101C, and when the player P is in the area 102D, it is preferable that the selection unit 305 select a spectator camera AC-D, which captures the seating section 101D.

Figure 7:
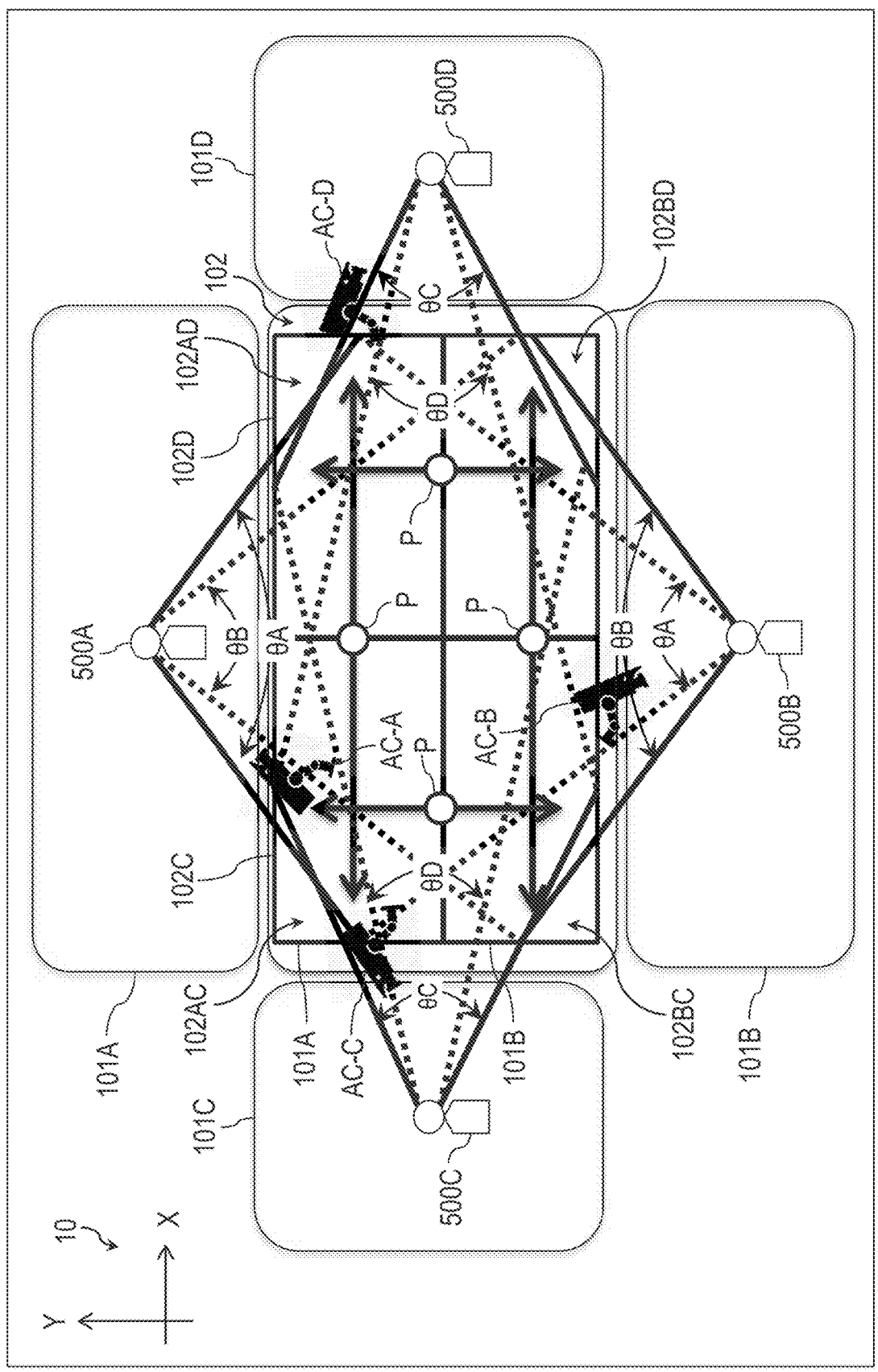
FIG. 7 is a descriptive view showing a sensitivity example 3 regarding dynamic changes in the viewing direction of the spectator.

FIG. 7 is a descriptive view showing a sensitivity example 3 regarding dynamic changes in the viewing direction of the spectator. A sensitivity example 3 is an example that combines the sensitivity examples 1 and 2. An overlapping area of the area 102A and the area 102C is an area 102AC, an overlapping area of the area 102A and the area 102D is an area 102AD, an overlapping area of the area 102B and the area 102C is an area 102BC, and an overlapping area of the area 102B and the area 102D is an area 102BD.

When the player P is in the area 102AC, it is preferable that the selection unit 305 select the spectator camera AC-A, which captures the seating section 101A, or the spectator camera AC-C, which captures the seating section 101C, and when the player P is in the area 102AD, it is preferable that the selection unit 305 select the spectator camera AC-A, which captures the seating section 101A, or the spectator camera AC-D, which captures the seating section 101D.

Viewing Direction of Spectator Group

Figure 8:
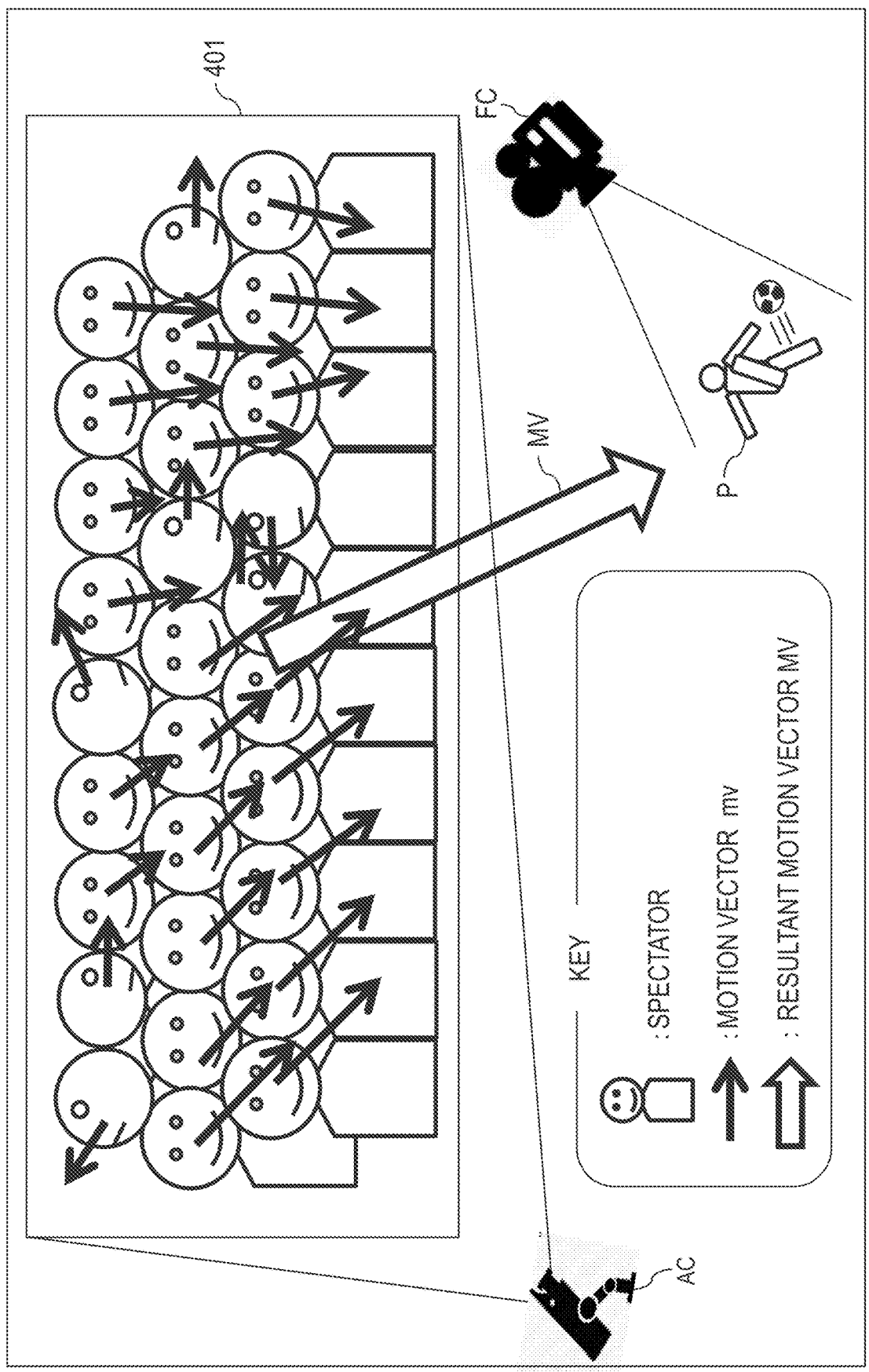
FIG. 8 is a descriptive view showing a detection example of the viewing direction of the spectator group.

FIG. 8 is a descriptive view showing a detection example of the viewing direction of the spectator group 401. The detection unit 301 detects a motion vector my of each spectator, and a resultant motion vector MV of the respective motion vectors my is generated as the viewing direction of the spectator group 401. In this case, the detection unit 301 may detect, as the viewing direction, the motion vector my according to the change in position of the iris in the eye region of the spectator, or may detect, as the viewing direction, the motion vector my according to the change in position of a part of the face (such as the ears) of the spectator.

The detection unit 301 may detect the direction of each part of the head of the spectator to identify the focus area. In performing head direction detection, the detection unit 301 uses an existing algorithm or the like to detect the head and the direction thereof from the image data. The detection unit 301 can detect the direction of the head from a facial image by learning the direction of the head (three degrees of freedom: yaw, roll, pitch) by deep learning.

Figure 9:
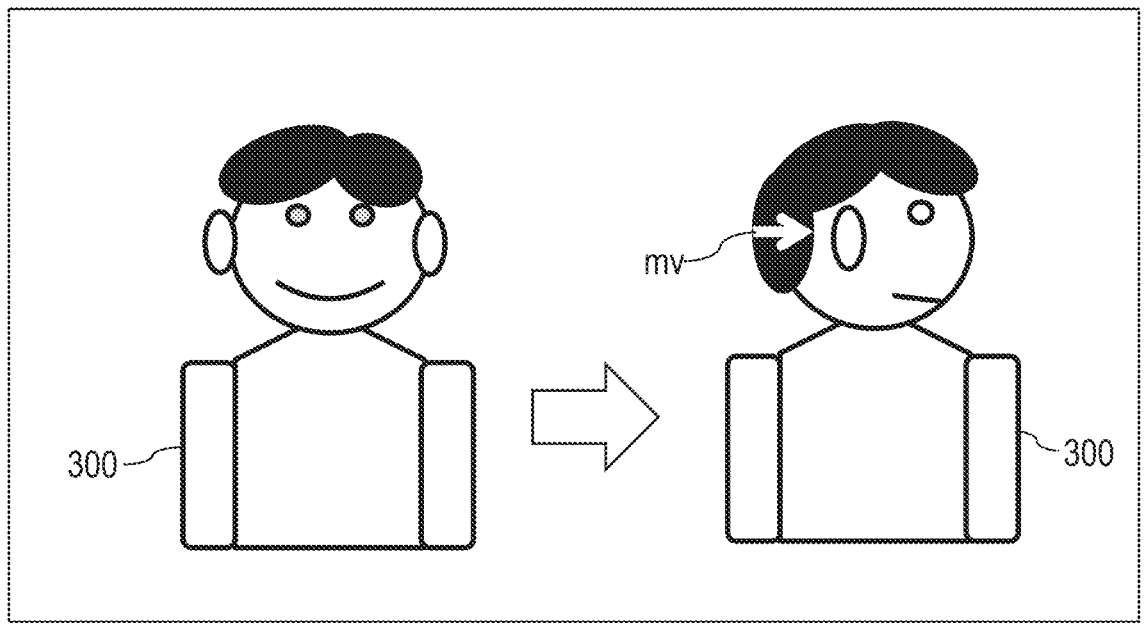
FIG. 9 is a descriptive view showing a detection example of a motion vector my resulting from a change in position of the ears.

FIG. 9 is a descriptive view showing a detection example of a motion vector my resulting from a change in position of the ears. If the spectator camera AC is an omnidirectional camera, then distortion occurs on both edges of each frame of the image data, and thus, by expanding both edges of the frame, the amount of change in position of the ears of the spectator is increased, which makes it easier for the detection unit 301 to detect the motion vector my.

Figure 10:
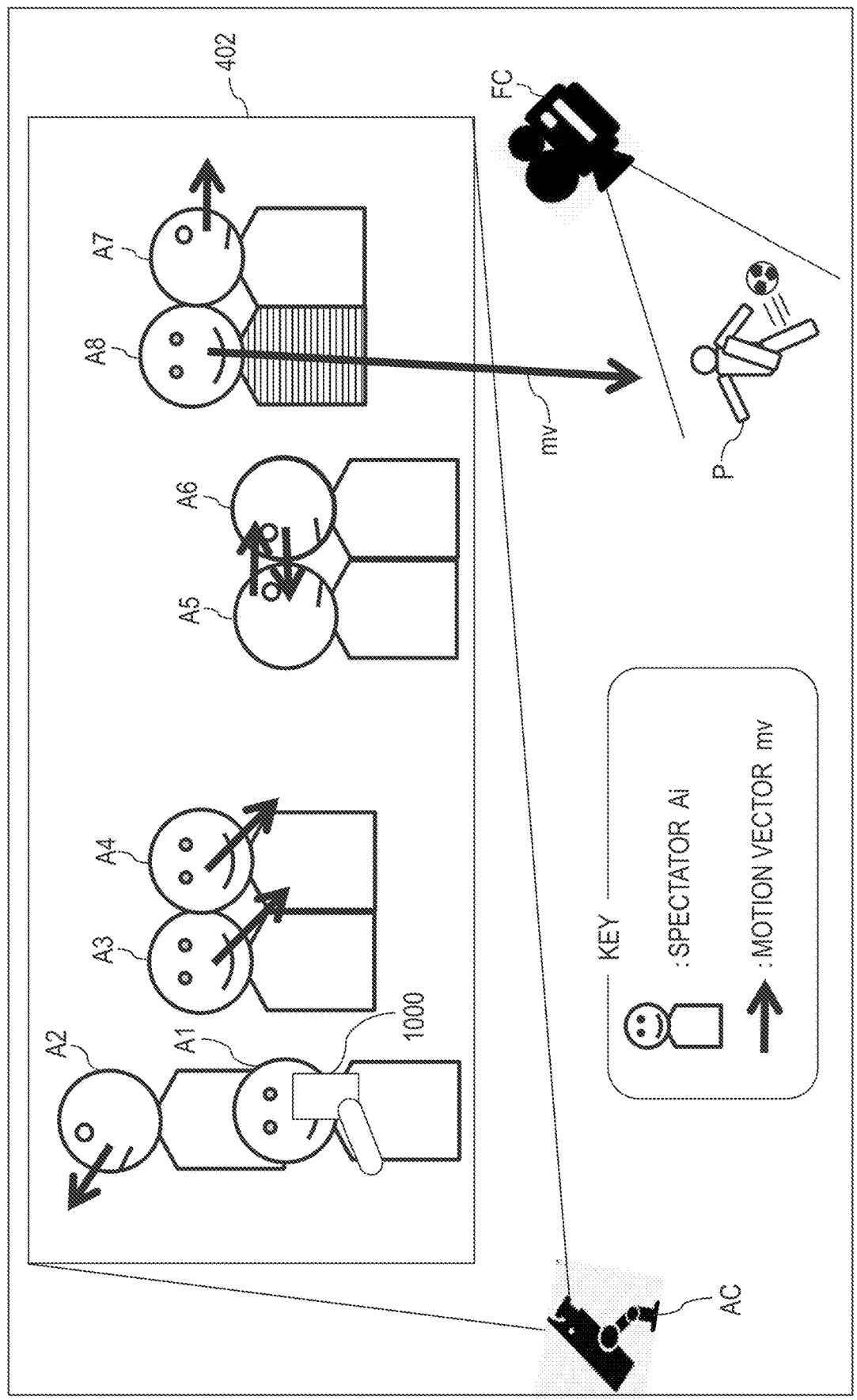
FIG. 10 is a descriptive view showing a detection example of the viewing direction of a specific spectator.

FIG. 10 is a descriptive view showing a detection example of the viewing direction of a specific spectator. As described above, in FIG. 10, the score indicating the number of people in the spectator group 402 is less than the threshold or is relatively low, and the selection unit 305 selects a specific spectator. In FIG. 10, among the spectators A1 to A8, the spectator A1 is looking at their smartphone 1000, and thus, is eliminated as noise.

The viewing direction of the spectator A2 is towards an electronic billboard, for example, and thus, the spectator A2 is eliminated as noise. The position of the electronic billboard is attained from design information of the facility. Thus, the selection unit 305 selects, as a specific spectator, any of the spectators A3 to A8. Among the spectators A3 to A8, if there is a spectator who matches the distinct person information 126 (spectator A8, for example), then the spectator A8 may be selected as the specific spectator.

Identification Example for Focus Area and Focus Subject

Figure 11:
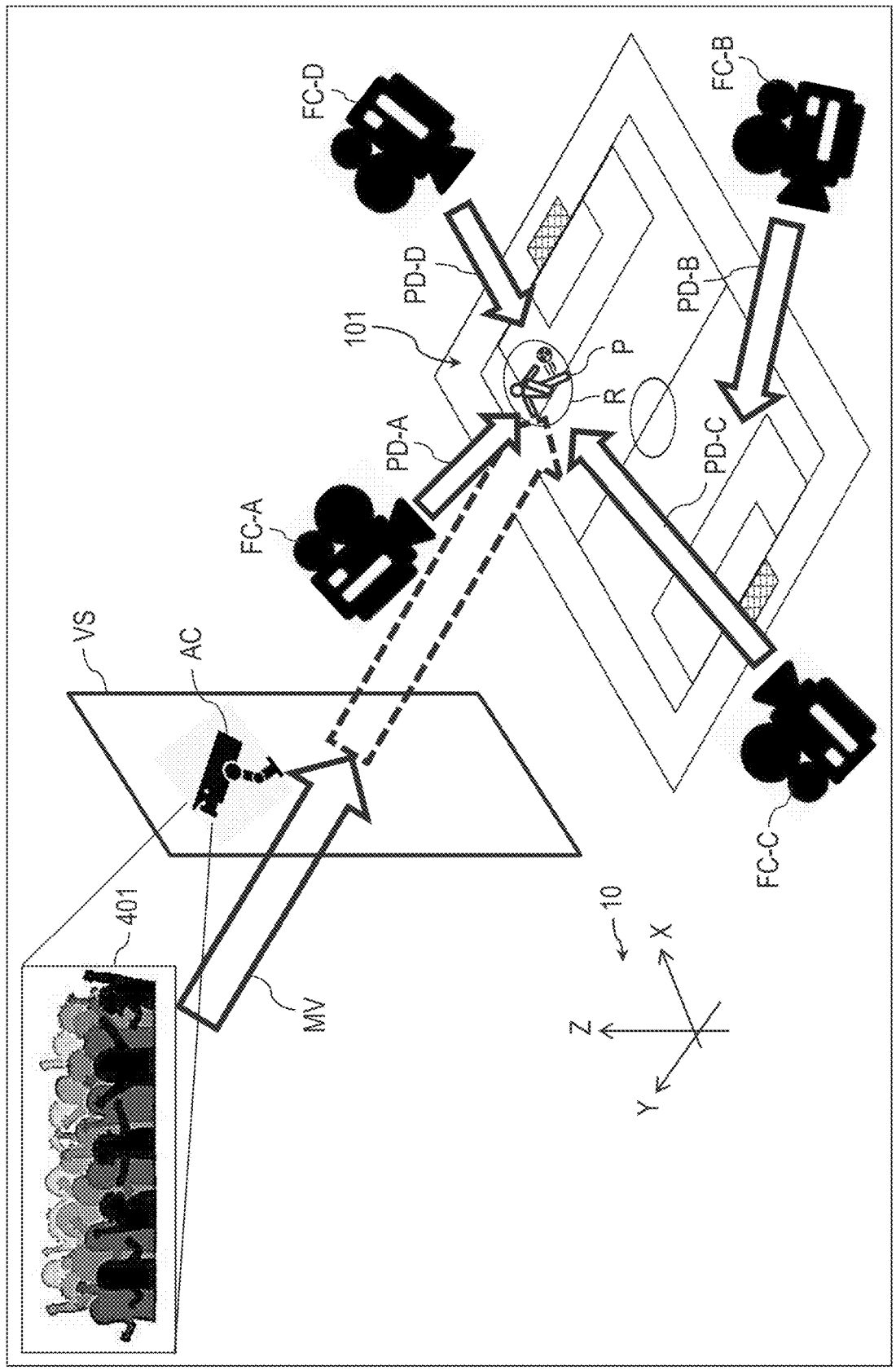
FIG. 11 is a descriptive view showing an identification example 1 for identification of the focus area and the focus subject by the identification unit.

FIG. 11 is a descriptive view showing an identification example 1 for identification of the focus area and the focus subject by the identification unit 302. A virtual plane VS is a plane parallel to the XZ plane. The spectator camera AC is located on the virtual plane VS. The identification unit 302 projects the resultant motion vector MV from the virtual plane VS towards the field 102, and identifies the focus area R that is a region on the field 102. The identification unit 302 identifies field cameras FC-A to FC-D that are imaging the focus area R according to the imaging directions PD-A to PD-D of the field cameras FC-A to FC-D.

Here, the identification unit 302 eliminates the field camera FC-B, the imaging direction PD-B of which is not towards the focus area R. In the case of FIG. 11, the identification unit 302 identifies the player P present in the focus area R as the focus subject according to the image data from the field cameras FC-A, FC-C, and FC-D.

Figure 12:
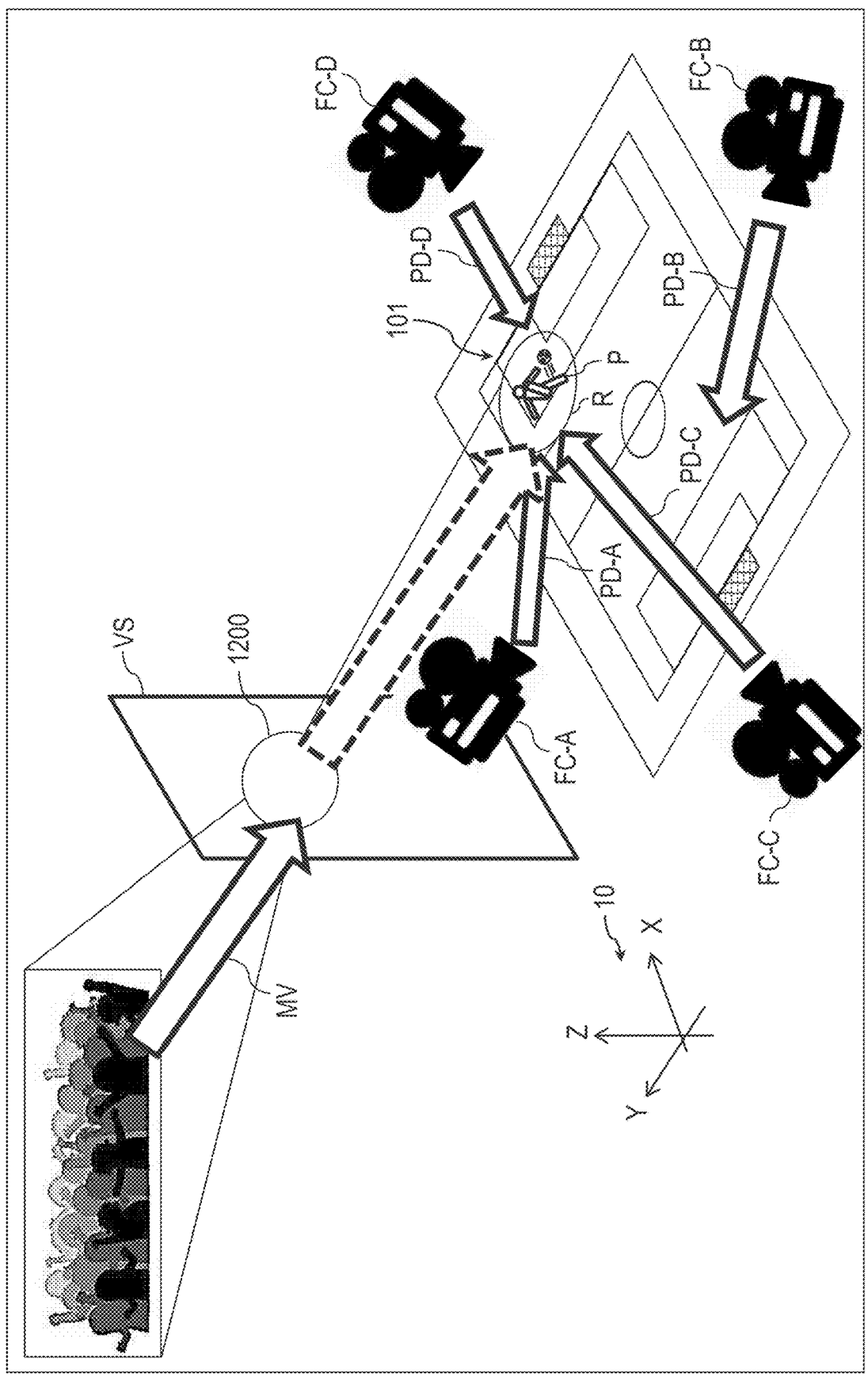
FIG. 12 is a descriptive view showing an identification example 2 for identification of the focus area and the focus subject by the identification unit.

FIG. 12 is a descriptive view showing an identification example 2 for identification of the focus area and the focus subject by the identification unit 302. The identification example of FIG. 12 is an example using an omnidirectional camera 1200 as the spectator camera AC. By using the omnidirectional camera 1200, the field 102 opposite, with respect to the omnidirectional camera 1200, to the spectator group 401, which is the origin of the resultant motion vector MV, can be captured. Thus, the identification unit 302 can simultaneously identify the focus area R on the field 102 and the focus subject (player P) indicated by the resultant motion vector MV from the image data of the omnidirectional camera 1200.

Figure 13:
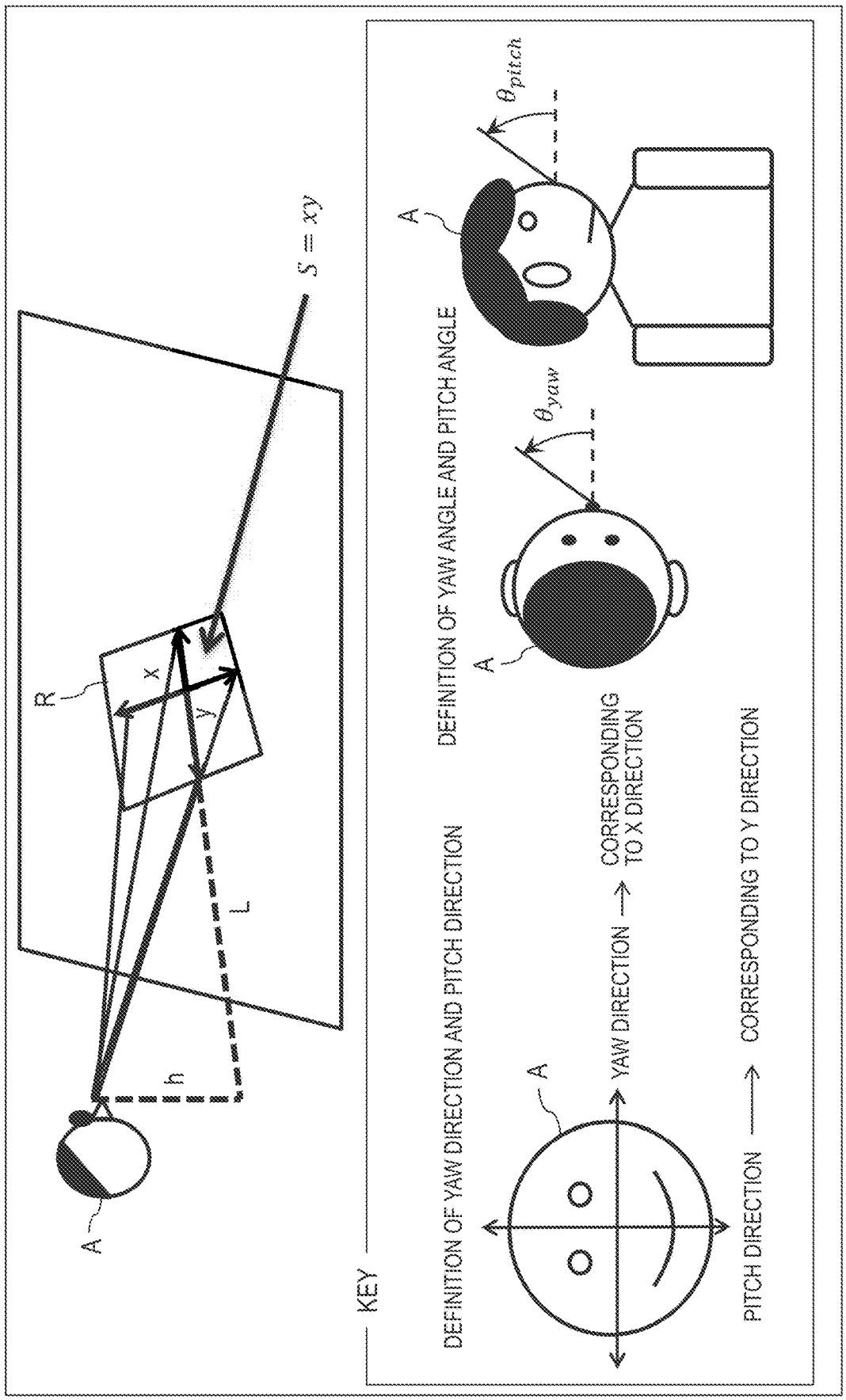
FIG. 13 is a descriptive view showing a calculation example for the area of the focus area.

FIG. 13 is a descriptive view showing a calculation example for the area of the focus area. In FIG. 13, the focus area R is rectangular. When the spectator A views the focus area, where the height of the spectator A from the field 102 is h, the distance to the focus area R when the spectator A is projected onto the field 102 is L, and the lengths of the two perpendicular sides of the focus area R are x and y, x is determined by the following formula (1) and y is determined by the following formula (2). θ± is determined by the following formula (3), and the distance D from the spectator A to the focus area R is determined by the following formula (4) (regarding the yaw angle θyaw and the pitch angle θpitch, see key of FIG. 13).

$$x = \sqrt{2(h^2 + L^2)(1 - \cos 2\theta_{yaw})} \quad (1)$$

$$y = h\left(\sqrt{\frac{1}{\cos^2 \theta_+} - 1} - \sqrt{\frac{1}{\cos^2 \theta_-} - 1}\right) \quad (2)$$

$$\theta_\pm = \cos^{-1} \frac{h}{D} \pm \theta_{pitch} \quad (3)$$

$$D = \sqrt{h^2 + L^2} \quad (4)$$

The area S of the focus area R is calculated by S=x·y. As a result, the identification unit 302 can identify the distance D from the spectator A to the focus area R and the area S of the focus area R, and can identify the focus subject (such as the player P) in the focus area R according to the distance D and the area S. Here, the spectator A was used as the reference example, but in the case of the spectator group 401, the starting position of the resultant motion vector MV may be the position of the spectator A.

Example of Control Process Steps

Figure 14:
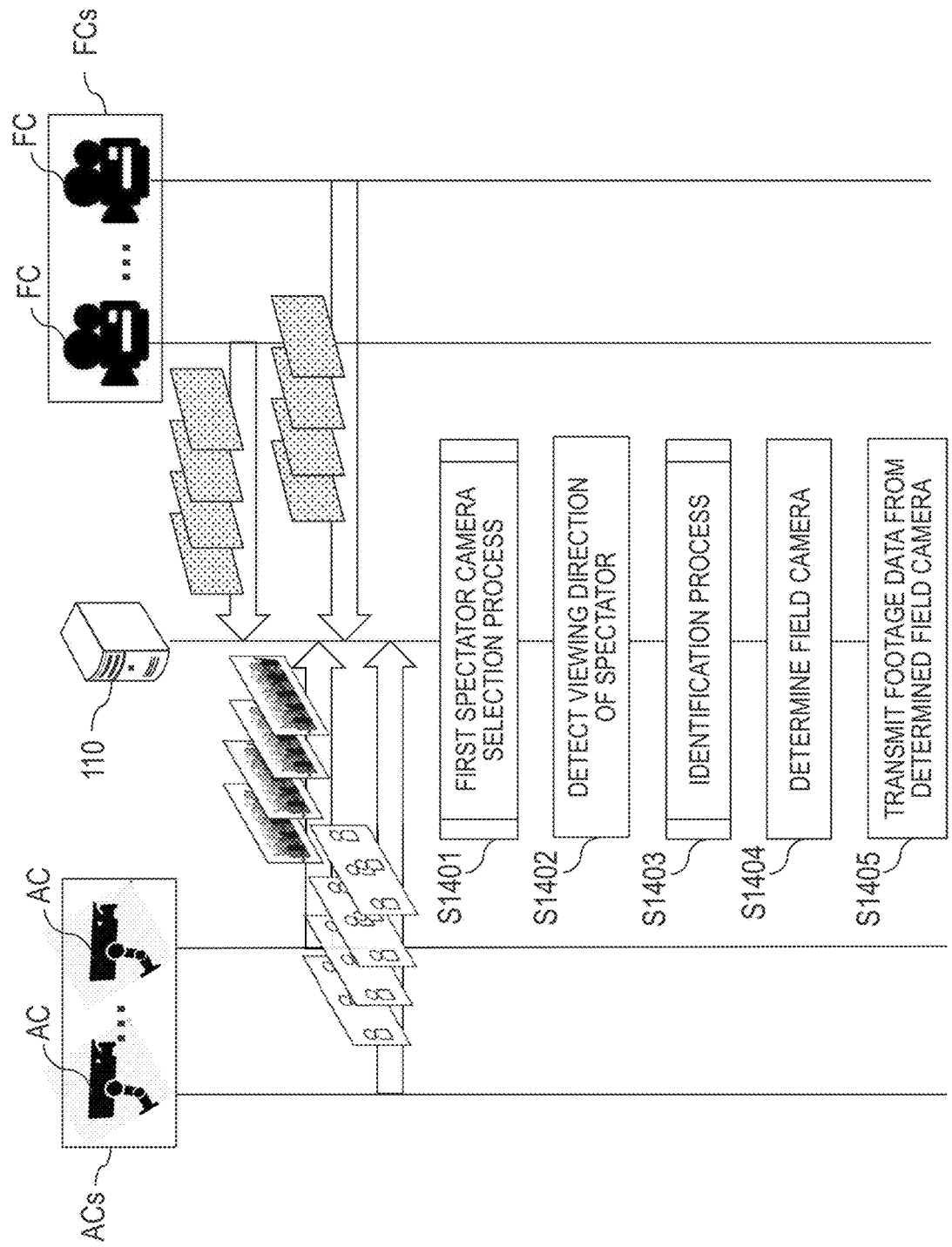
FIG. 14 is a flowchart showing an example of control process steps by the control apparatus.

FIG. 14 is a flowchart showing an example of control process steps by the control apparatus 110. The control apparatus 110 acquires image data from the spectator cameras AC and image data from the field cameras FC. The control apparatus 110 uses the selection unit 305 to execute a first spectator camera selection process to select a spectator camera AC for detecting the viewing direction (step S1401). Next, the control apparatus 110 uses the detection unit 301 to analyze image data from the selected spectator camera AC to detect the viewing direction (step S1402).

Next, the control apparatus 110 uses the identification unit 302 to execute an identification process for identifying the focus area and the focus subject, using a vector of the detected viewing direction (step S1403). Then, the control apparatus 110 determines a field camera FC, from among the plurality of field cameras FC, that is capturing the focus subject (step S1404).

Then, the control apparatus 110 uses the transmission unit 304 to transmit the image data from the determined field camera FC via the broadcast tower 210 or the internet 200 (step S1405). As a result, it is possible to automatically switch the field camera FC to a focus subject present in the direction viewed by the spectator group.

Figure 15:
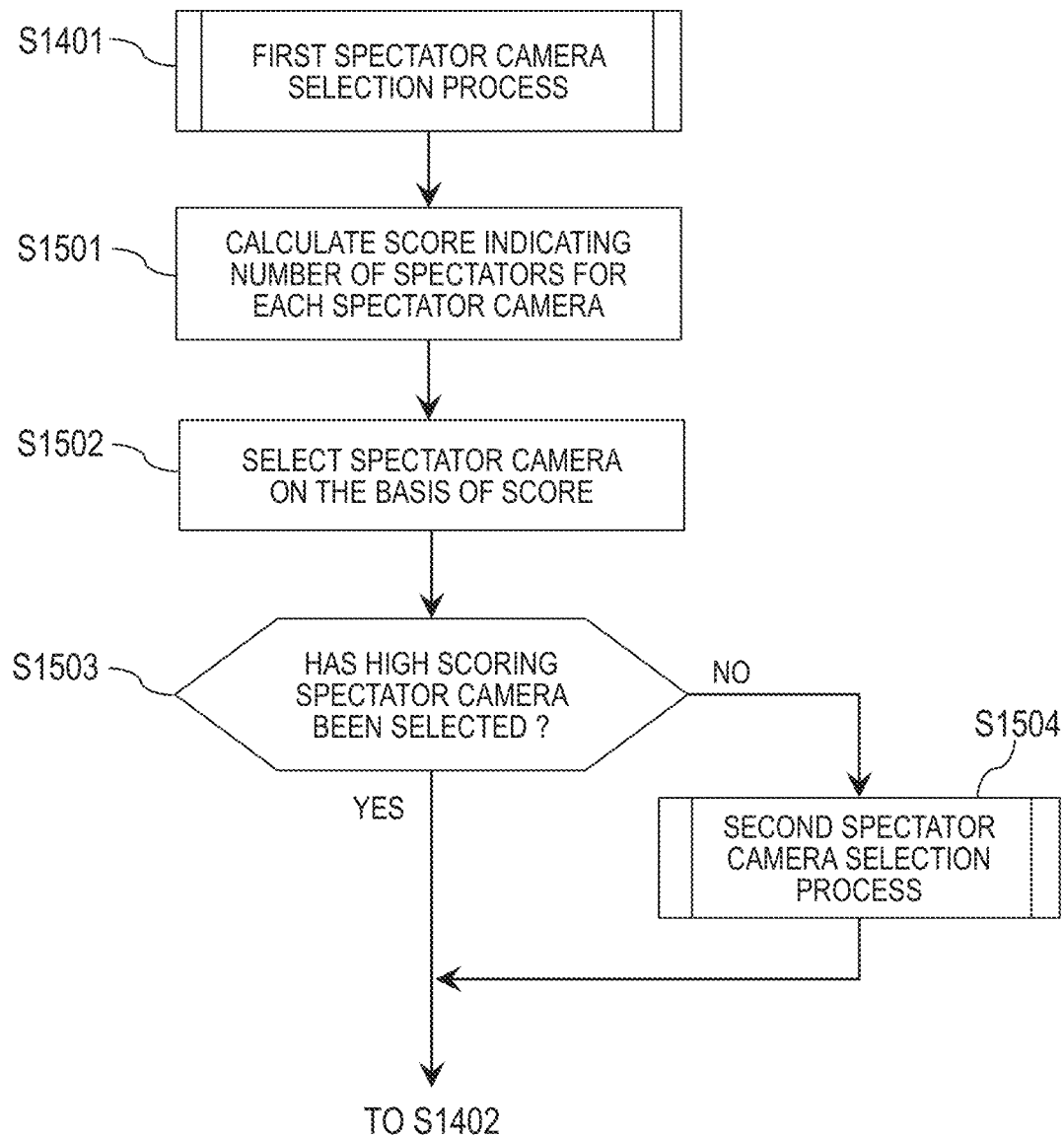
FIG. 15 is a flow chart showing a detailed processing example 1 of the first spectator camera selection process (step S1401), shown in FIG. 14, performed by the selection unit.

FIG. 15 is a flow chart showing a detailed processing example 1 of the first spectator camera selection process (step S1401), shown in FIG. 14, performed by the selection unit 305. The control apparatus 110 uses the selection unit 305 to calculate the score indicating the number of spectators captured by each spectator camera AC (step S1501). Next, the control apparatus 110 uses the selection unit 305 to select the spectator camera AC on the basis of the calculated score as described above (step S1502).

For example, the control apparatus 110 selects a spectator camera AC with a score greater than or equal to the threshold or a relatively high score. In the selection performed in step S1502, if there is a spectator camera AC with a score greater than or equal to the threshold or a relatively high score, the control apparatus 110 may select the spectator camera AC in a probabilistic manner (with a 70% probability, for example).

Next, the control apparatus 110 uses the selection unit 305 to determine whether a spectator camera AC with a score greater than or equal to the threshold or a relatively high score has been selected (step S1503). If a spectator camera AC with a score greater than or equal to the threshold or a relatively high score has been selected (step S1503: yes), then the process progresses to step S1402. In this case, the control apparatus 110 uses the detection unit 301 to detect the resultant motion vector MV of the spectator group 401 as the viewing direction.

On the other hand, if a spectator camera AC with a score greater than or equal to the threshold or a relatively high score has not been selected (step S1503: no), then the control apparatus 110 uses the selection unit 305 to execute a second spectator camera selection process (step S1504) and the process progresses to step S1402. In the second spectator camera selection process (step S1504), a specific spectator A8 among the spectator group 402 is selected. In this case, the control apparatus 110 uses the detection unit 301 to detect the motion vector my of the specific spectator A8 as the viewing direction.

Figure 16:
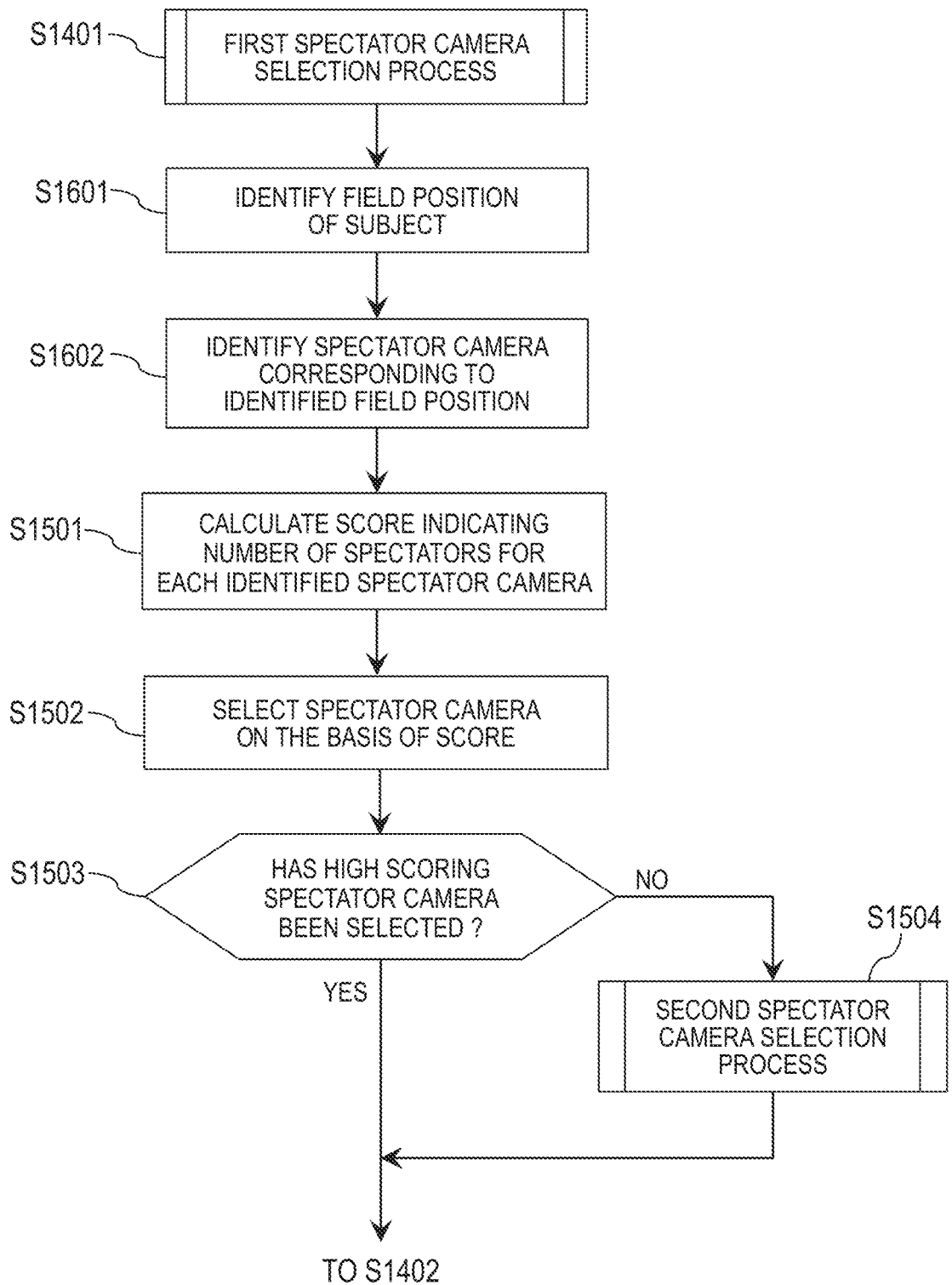
FIG. 16 is a flow chart showing a detailed processing example 2 of the first spectator camera selection process (step S1401), shown in FIG. 14, performed by the selection unit.

FIG. 16 is a flow chart showing a detailed processing example 2 of the first spectator camera selection process (step S1401), shown in FIG. 14, performed by the selection unit 305. In FIG. 16, processes that are the same as those in FIG. 15 are assigned the same step number and explanations thereof are omitted. The control apparatus 110 uses the identification unit 302 to identify the focus subject identified previously by the identification unit 302 and the focus area thereof, and identifies the spectator camera AC as shown in FIGS. 5 to 7 according to the positional relationship between the identified focus area and each spectator camera AC (step S1602).

A plurality of spectator cameras AC may be identified in step S1602. If, for example, the player P who is the focus subject is in the area 102AC, the spectator cameras AC-A and AC-C, which are close to the area 102AC, are identified. Then, as shown in FIG. 15, steps S1501 to S1504 are executed for the spectator cameras AC identified in step S1602. As a result, the spectator cameras AC closest to the position of the focus subject are more likely to be selected, which improves the detection sensitivity for the viewing direction.

Figure 17:
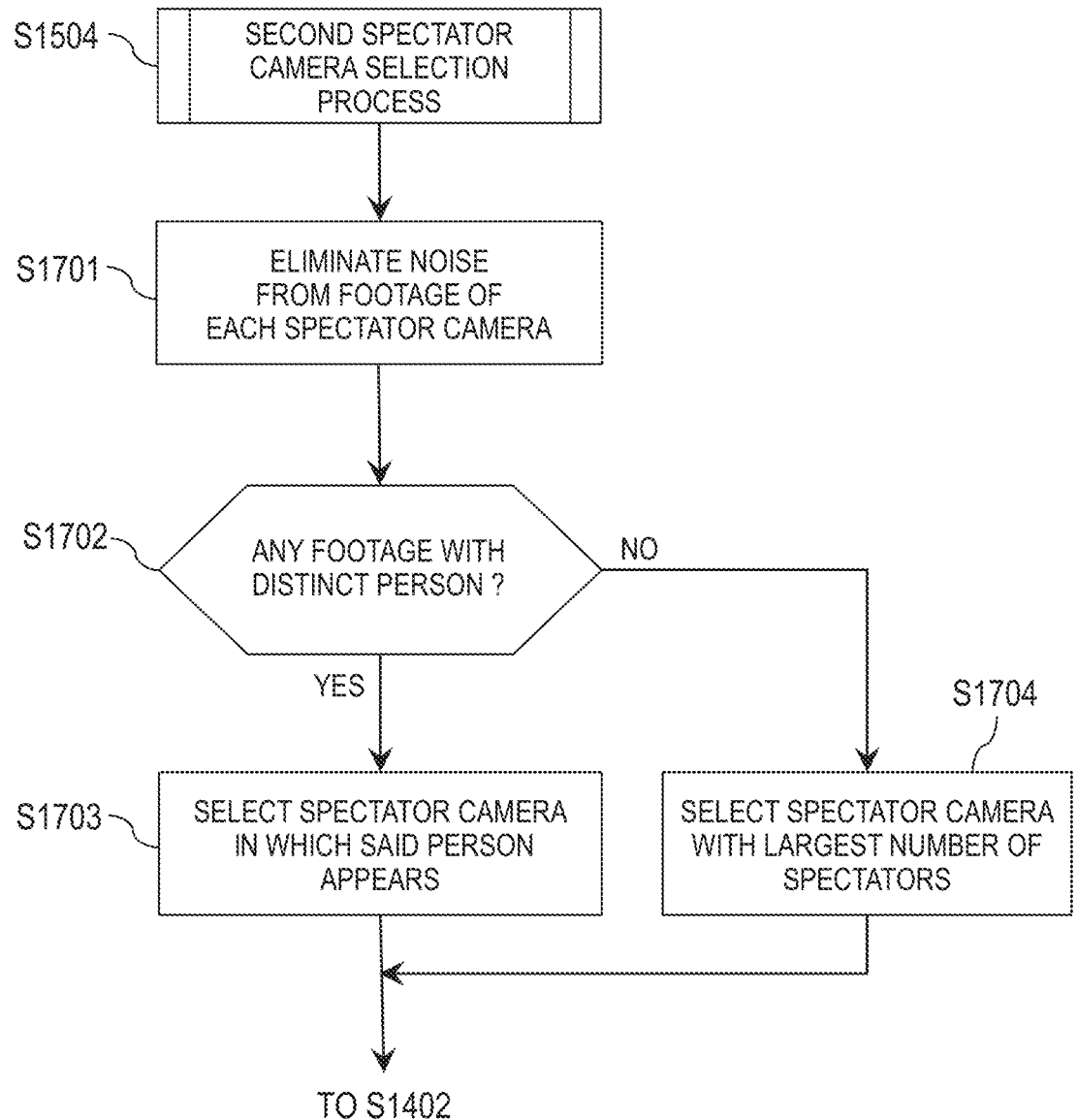
FIG. 17 is a flow chart showing a detailed processing example 1 of the second spectator camera selection process (step S1504) shown in FIG. 15.

FIG. 17 is a flow chart showing a detailed processing example 1 of the second spectator camera selection process (step S1504) shown in FIG. 15. The control apparatus 110 uses the selection unit 305 to eliminate noise from the image data from each spectator camera AC (step S1701). Next, the control apparatus 110 uses the selection unit 305 to determine whether image data of a distinct person is present in the image data from each spectator camera AC from which noise was eliminated (step S1702).

If there is a spectator camera AC that has acquired image data in which image data of a distinct person is present (step S1702: yes), then the control apparatus 110 uses the selection unit 305 to select the spectator camera AC (step S1703) and progresses to step S1402. On the other hand, if there is no spectator camera AC that has acquired image data in which image data of a distinct person is present (step S1702: no), then the control apparatus 110 uses the selection unit 305 to select the spectator camera AC with the highest score (step S1704) and the process progresses to step S1704.

Figure 18:
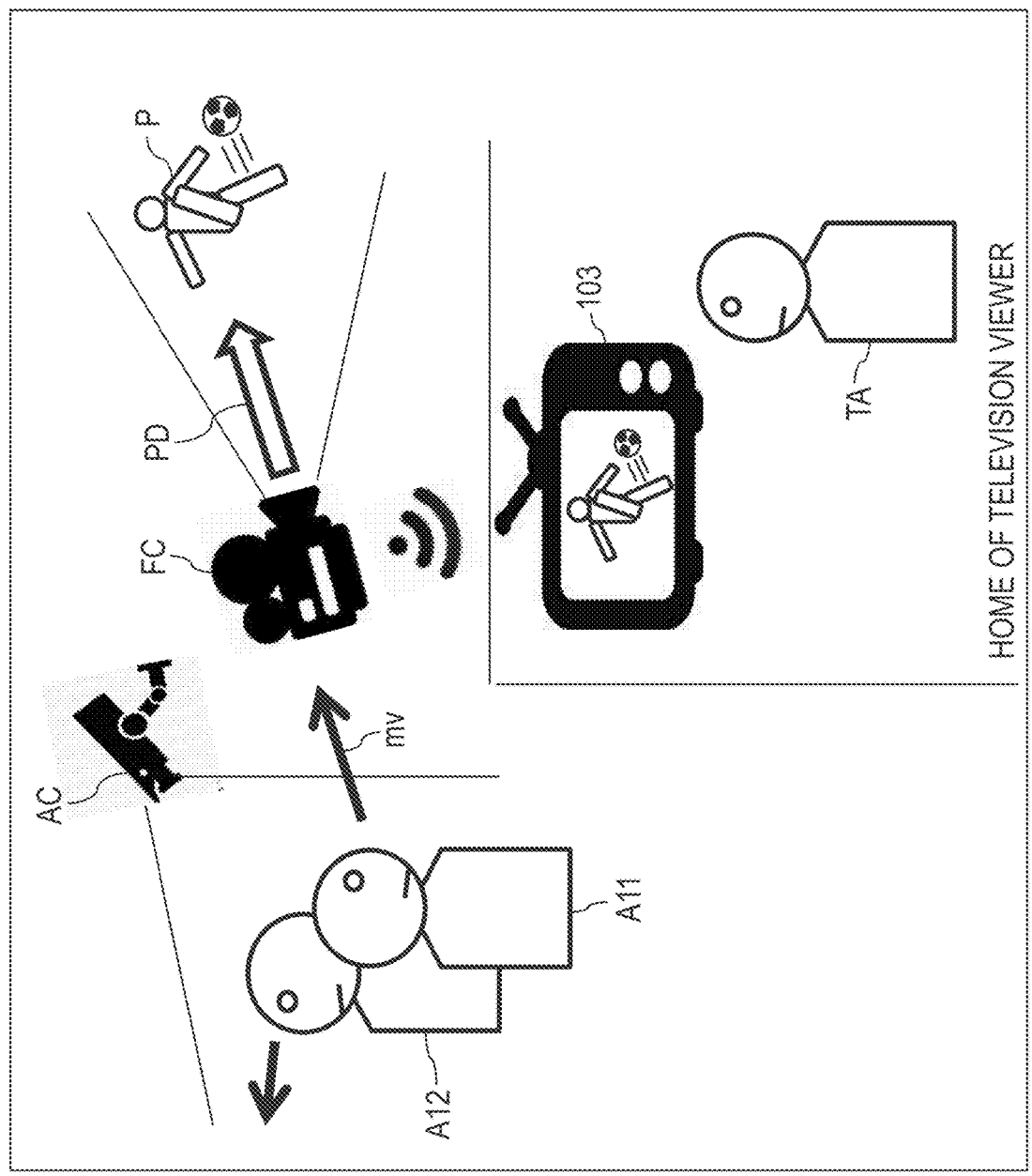
FIG. 18 is a descriptive view showing a detailed processing example 2 of the second spectator camera selection process (step S1504) shown in FIG. 15.

FIG. 18 is a descriptive view showing a detailed processing example 2 of the second spectator camera selection process (step S1504) shown in FIG. 15. Specifically, for example, the control apparatus 110 uses the selection unit 305 to select, as a specific spectator, a spectator A11 who is viewing the same scene as that being viewed by a viewer TA of the television 103.

The scene viewed by a viewer TA of the television 103 is the player P (focus subject) captured by the field camera FC in the imaging direction PD thereof. The control apparatus 110 identifies the seating section 101 in the opposite direction to the imaging direction PD of the field camera FC that is currently broadcasting, and selects the spectator camera AC in which the identified seating section 101 appears. If, according to the spectator group 402 (including spectators A11 and A12) captured by the selected spectator camera AC, the motion vector my is the same as the imaging direction PD or at an angle within an allowable range thereof, then the spectator A11 is selected as the specific spectator.

Figure 19:
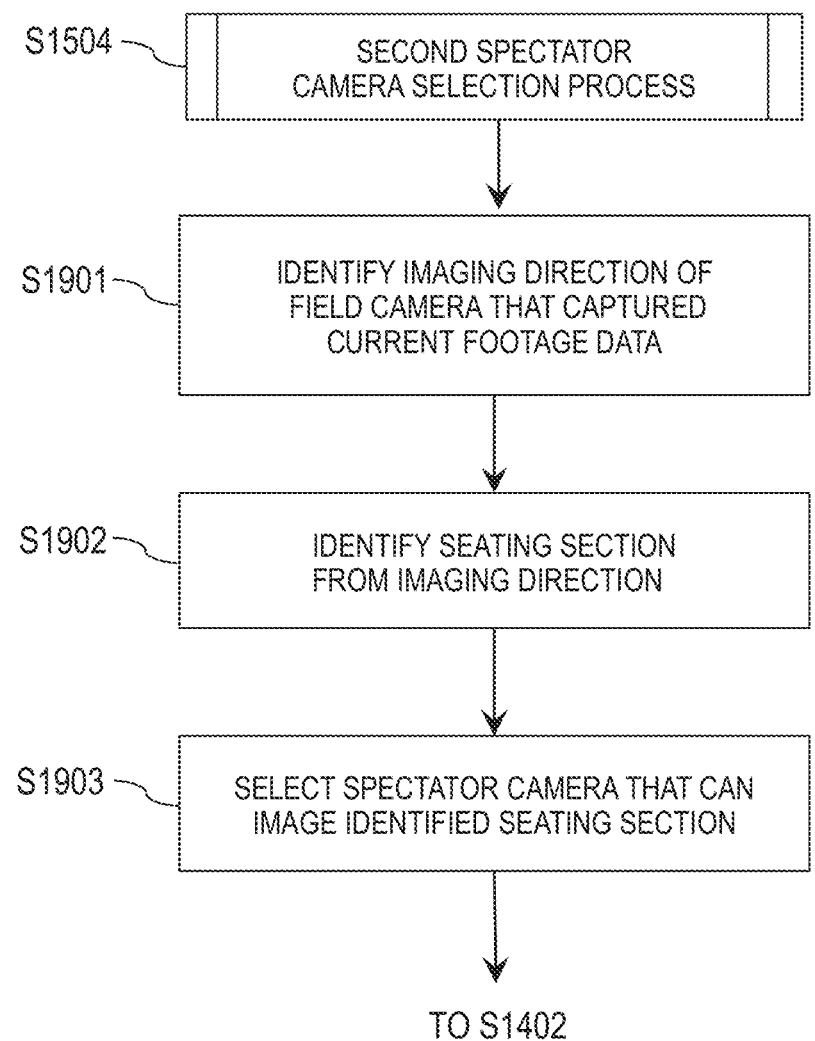
FIG. 19 is a flow chart showing a detailed processing example 2 of the second spectator camera selection process (step S1504) shown in FIG. 15.

FIG. 19 is a flow chart showing a detailed processing example 2 of the second spectator camera selection process (step S1504) shown in FIG. 15. The control apparatus 110 uses the selection unit 305 to identify the imaging direction of the field camera FC that is capturing the current image data (step S1901), identifies the seating section 101 in the opposite direction to the identified imaging direction (step S1902), and selects the spectator camera AC in which the identified seating section 101 can be captured (step S1903). As a result, it is possible to select, as the specific spectator, the spectator A11 who is viewing the same scene as that being viewed by a viewer TA of the television 103, and it is possible improve the estimation accuracy for the identified spectator.

Figure 20:
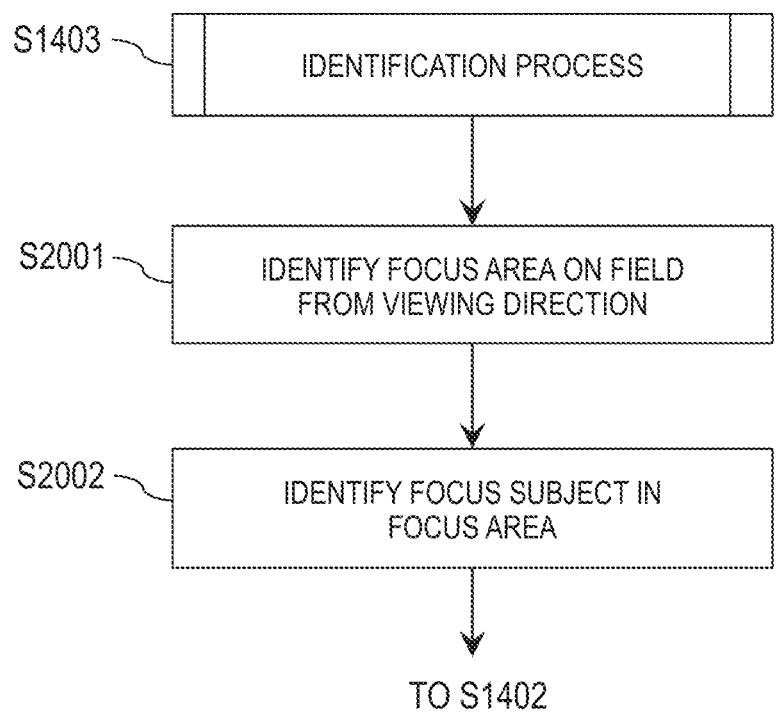
FIG. 20 is a flow chart showing an example of detailed process steps of the identification process (step S1403) shown in FIG. 14.

FIG. 20 is a flow chart showing an example of detailed process steps of the identification process (step S1403) shown in FIG. 14. The control apparatus 110 uses the identification unit 302 to identify the focus area on the field 102 according to the viewing direction attained in step S1402 as shown in FIGS. 11 to 13 (step S2001). Next, the control apparatus 110 uses the identification unit 302 to identify the focus subject (such as the player P) in the focus area identified in step S2001, as shown in FIGS. 11 to 13 (step S2002).

In the example of FIG. 11, the control apparatus 110 uses the image data from the field camera FC to identify the focus subject (such as the player P) in the focus area identified in step S2001. As a result, it is possible to identify the focus subject at the end of the viewing direction with a high degree of accuracy. Also, in the example of FIG. 12, the control apparatus 110 uses the image data from the omnidirectional camera to identify the focus subject (such as the player P) in the focus area identified in step S2001.

As a result, it is possible to simultaneously identify the focus area and the focus subject (player P) from the image data from one omnidirectional camera, and further improve identification accuracy. Additionally, it is also possible to improve processing speed and detection frequency. Thus, the control apparatus 110 may identify the focus area using the image data of one camera or identify a focus subject in the focus area R.

(1) As described above, the control apparatus 110 according to the present embodiment can access the database 120, which stores design information pertaining to the facility (such as the stadium 100), a plurality of first cameras (such as the spectator camera group ACs) that image a first subject in a first area (such as the seating section 101) in the facility, and a plurality of second cameras (such as the field camera group FCs) that image a second subject in a second area (such as the field 102) in the facility.

The control apparatus 110 has the detection unit 301, the identification unit 302, the determination unit 303, and the transmission unit 304. The detection unit 301 detects the viewing direction of the spectator group 401 in the first subject on the basis of image data of the first subject captured by any one of the plurality of first cameras.

The identification unit 302 identifies the focus area R in the second area by the spectator group 401 on the basis of the viewing direction of the spectator group 401 detected by the detection unit 301, and identifies the focus subject of the spectator group present in the focus area R on the basis of the image data of the second subject captured by each of the plurality of second cameras. The determination unit 303 determines a specific second camera to be the transmission source of image data from among the plurality of second cameras on the basis of the focus subject identified by the identification unit 302. The transmission unit 304 transmits image data from a specific second camera determined by the determination unit 303.

As a result, image data from the determined second camera (field camera FC) is broadcasted or distributed to the television 103 or the personal computer 104. Thus, switching of the second cameras (field cameras FC) can be automated.

(2) Also, the control apparatus 110 of (1) has a selection unit 305 that selects a specific first camera from among the plurality of first cameras on the basis of a score indicating the number of people in the spectator group 401 in the first subject captured by each of the plurality of first cameras.

As a result, the detection unit 301 detects the viewing direction of the specific spectator group 401 in the specific first subject on the basis of the image data of the specific first subject captured by the specific first camera, and the identification unit 302 identifies the focus area R of the specific spectator group 401 on the basis of the viewing direction of the specific spectator group 401 detected by the detection unit 301. Thus, switching of the second cameras (field cameras FC) can be automated according to the number of spectators.

(3) Also, in the control apparatus 110 of (2), the selection unit 305 may select a specific first camera on the basis of the positional relationship between the spectator group 401 and the focus area R. As a result, it is possible to take into consideration the detection sensitivity of the viewing direction and identify the specific first camera (field camera FC).

(4) Alternatively, in the control apparatus 110 of (2), the selection unit 305 may select, as the specific first camera, a first camera for which the score is greater than or equal to the image data threshold. As a result, it is possible to detect the viewing direction of the spectator group 401 using the image data from the first camera that has been evaluated as covering a large absolute number of spectators. Thus, it is possible to automatically switch to a second camera that captures a focus area or a focus subject viewed by a large number of spectators, and as a result, viewers of the broadcast can see the focus area R and the focus subject viewed by many spectators.

(5) Alternatively, in the control apparatus 110 of (2), the selection unit 305 may select, as the specific first camera, a first camera having a relatively high score among the plurality of first cameras. As a result, it is possible to detect the viewing direction of the spectator group 401 using the image data from the first camera that has been evaluated as covering a relatively large number of spectators. Thus, it is possible to automatically switch to a second camera that captures a focus area or a focus subject viewed by a large number of spectators, and as a result, viewers of the broadcast can see the focus area R and the focus subject viewed by many spectators.

(6) Alternatively, in the control apparatus 110 of (2), the selection unit 305 may select, as the specific first camera, a first camera for which the score is less than the image data threshold. As a result, it is possible to detect the viewing direction of the spectator group 402 using the image data from the first camera that has been evaluated as covering a small absolute number of spectators. Thus, it is possible to automatically switch to a second camera that captures a focus area or a focus subject viewed by a small number of spectators, and as a result, viewers of the broadcast can see the focus area R and the focus subject viewed by a small number of spectators. In other words, it is possible to automatically switch to image data of a focus area R or a focus subject that was not viewed by many spectators.

(7) Alternatively, in the control apparatus 110 of (2), the selection unit 305 may select, as the specific first camera, a first camera having a relatively low score among the plurality of first cameras. As a result, it is possible to detect the viewing direction of the spectator group 402 using the image data from the first camera that has been evaluated as covering a relatively small number of spectators. Thus, it is possible to automatically switch to a second camera that captures a focus area or a focus subject viewed by a small number of spectators, and as a result, viewers of the broadcast can see the focus area R and the focus subject viewed by a small number of spectators. In other words, it is possible to automatically switch to image data of a focus area R or a focus subject that was not viewed by many spectators.

(8) Also, in the control apparatus 110 of (6) or (7), the detection unit 301 may detect the viewing direction of a specific spectator in the specific spectator group 402 in the specific first subject on the basis of the image data of the specific first subject captured by the specific first camera. In this manner, the identification unit 302 identifies the focus area R of the specific spectator A8 on the basis of the viewing direction of the specific spectator A8 detected by the detection unit 301.

As a result, if the number of spectators is evaluated to be small in an absolute or relative sense, the viewer can see the focus area R or the focus subject viewed by a specific spectator. Even if the number of spectators is small, there is a high probability that such spectators are dedicated fans, and thus, by switching the second camera to the focus area R and the focus subject viewed by the viewers according to the perspective of such spectators, it is possible to provide image data to the viewer from the perspective of such expert spectators.

(9) In the control apparatus 110 of (8), the detection unit 301 may select a specific spectator A8 from among the spectators A3 to A8, in the specific spectator group 402, that are remaining after excluding the spectators A1 and A2 who are engaging in inattentive behavior, on the basis of the image data of the specific first subject, and detect the viewing direction of the specific spectator A8. As a result, noise that is irrelevant to attentive viewing is eliminated, which improves the accuracy of detecting the viewing direction.

(10) Also, in the control apparatus 110 of (8), the database 120 stores image data (distinct person information 126) pertaining to a distinct person, and the detection unit 301 may detect the distinct person as a specific spectator from among the specific spectator group 402 on the basis of the image data of the specific first subject, and detect the viewing direction of the specific spectator A8.

As a result, it is possible to improve the detection accuracy for the specific spectator by matching the spectator with a distinct person. Thus, by switching the second camera to the focus area R and the focus subject viewed by the viewers according to the perspective of such spectators, it is possible to provide image data to the viewer from the perspective of such expert spectators.

(11) Also, in the control apparatus 110 of (6) or (7), the detection unit 301 may detect the viewing direction of a specific spectator A11 on the basis of the imaging direction of the specific second camera determined by the determination unit 303 and the viewing direction of each individual among the specific spectator group 401. As a result, it is possible to identify spectators viewing the same focus area R and focus subject as the image data viewed by the viewer of the broadcast, and thus, it is possible to switch scenes according to the perspective of the spectator to a greater degree.

(12) In the control apparatus 110 of (1), the first cameras are cameras that can image a first area (seating section 101) and a second area (field 102) (omnidirectional cameras 1200, for example), the detection unit 301 may detect the viewing direction of the spectator group 401 on the basis of the image data including the first subject and the second subject captured by any of the first cameras, and the identification unit 302 may identify the focus area R viewed by the spectator group 401 in the second area and the spectator group 401 present in the focus area R on the basis of the viewing direction of the spectator group 401 detected by the detection unit 301.

As a result, the focus area R and the focus subject are identified from the image data of the first cameras, and thus, the image data from the second cameras is not used here.

Thus, it is possible to improve the accuracy of identification of the focus area R and the focus subject. Also, the need to identify the focus subject using the second camera is eliminated, and processing can be sped up.

(13) Also, in the control apparatus 110 of (1), the determination unit 303 may determine a specific second camera on the basis of the positional relationship between the spectator group 401 and the focus area R. As a result, it is possible to automatically switch between second cameras of various imaging directions while taking into consideration the positional relationship between the spectator group 401 and the focus area R.

If, for example, the positional relationship indicates that the spectator group 401 is close to the focus area R, then it is possible to distribute image data under the environment in which the spectator group 401 is viewing the focus area R, and viewers of the broadcast can view the same focus subject from a perspective close to that of the spectator group 401. Also, if the positional relationship indicates that the spectator group 401 is far from the focus area R, then it is possible to distribute image data from a different angle than the direction from which the spectator group 401 is viewing the focus area R, and viewers of the broadcast can view the same focus subject from a perspective differing from that of the spectator group 401.

(14) Also, in the control apparatus 110 of (1), the determination unit 303 may determine a specific second camera on the basis of the recognition results of the focus subject. As a result, by determining a second camera having an imaging direction that allows the face of the player P who is the focus subject to be seen instead of basing the determination on the spectator group 401, for example, the viewer of the broadcast can see the player P from the front in a scene after switching between second cameras.

(15) Also, in the control apparatus 110 of (1), the transmission unit 304 may transmit image data captured by a specific second camera or information indicating where the image data is stored to the communication terminal 300 of at least one spectator A in the spectator group 401. As a result, the scene after switching between the second cameras is sometimes a decisive moment, and thus, it is believed that during such scenes, the spectator group 401 would be focused on viewing the scene instead of photographing the scene. Thus, by transmitting still image data of the scene after switching to the spectator group 401 to the communication terminal 300 of the spectator group 401, it is possible to provide the decisive still image data that could not be photographed by the spectator group 401 to the spectator group 401.

(16) Also, the control system 1 according to the present embodiment has the database 120, which stores design information pertaining to the facility (such as the stadium 100), a plurality of first cameras (such as the spectator camera group ACs) that image a first subject in a first area (such as the seating section 101) in the facility, a plurality of second cameras (such as the field camera group FCs) that image a second subject in a second area (such as the field 102) in the facility, and the control apparatus 110, which can access the aforementioned elements.

The control apparatus 110 has the detection unit 301, the identification unit 302, the determination unit 303, and the transmission unit 304. The detection unit 301 detects the viewing direction of the spectator group 401 in the first subject on the basis of image data of the first subject captured by any one of the plurality of first cameras.

The identification unit 302 identifies the focus area R in the second area by the spectator group 401 on the basis of the viewing direction of the spectator group 401 detected by the detection unit 301, and identifies the focus subject of the spectator group present in the focus area R on the basis of the image data of the second subject captured by each of the plurality of second cameras. The determination unit 303 determines a specific second camera to be the transmission source of image data from among the plurality of second cameras on the basis of the focus subject identified by the identification unit 302. The transmission unit 304 transmits image data from a specific second camera determined by the determination unit 303.

As a result, image data from the determined second camera (field camera FC) is broadcasted or distributed to the television 103 or the personal computer 104. Thus, switching of the second cameras (field cameras FC) can be automated.

(17) Also, the control program according to the present embodiment is executed by the processor 201, which can access the database 120, which stores design information pertaining to the facility (such as the stadium 100), a plurality of first cameras (such as the spectator camera group ACs) that image a first subject in a first area (such as the seating section 101) in the facility, and a plurality of second cameras (such as the field camera group FCs) that image a second subject in a second area (such as the field 102) in the facility.

The control program causes the processor 201 to execute the detection process, the identification process, the determination process, and the transmission process. During the detection process, the control program causes the processor 201 to detect the viewing direction of the spectator group 401 in the first subject on the basis of image data of the first subject captured by any one of the plurality of first cameras.

During the identification process, the control program causes the processor 201 to identify the focus area R in the second area that is focused on by the spectator group 401 on the basis of the viewing direction of the spectator group 401 detected by the detection process, and identify the focus subject of the spectator group present in the focus area R on the basis of the image data of the second subject captured by each of the plurality of second cameras.

During the determination process, the control program causes the processor 201 to determine a specific second camera to be the transmission source of image data from among the plurality of second cameras on the basis of the focus subject identified by the identification process. During the transmission process, the control program causes the processor 201 to transmit image data from the specific second camera determined by the determination process.

As a result, image data from the determined second camera (field camera FC) is broadcasted or distributed to the television 103 or the personal computer 104. Thus, switching of the second cameras (field cameras FC) can be automated with software.

Also, a limiting condition may be set such that the second camera is not switched until a predetermined period of time has elapsed since the second camera was previously switched. Also, a configuration may be adopted in which the relationship between the image data prior to switching and the second camera after the switch is learned and stored in the database 120, and when switching between the second cameras, the control apparatus 110 refers to the learned content to determine the second camera. As a result, it is possible to improve the determination accuracy for the second camera.

In the above embodiment, the control apparatus 110 may use imaging data from a past game in the same sport (information pertaining to techniques employed by directors, for example). Specifically, by engaging in machine learning of the imaging data, the control apparatus 110 can, for example, learn rules pertaining to optimal cut positions, and improve the detection accuracy of the viewing direction.

Also, the field cameras FC may have an automatic shutter function. Specifically, this function can be used even when the subject at the end of the viewing direction of the spectator group is still, for example.

Figure 21:
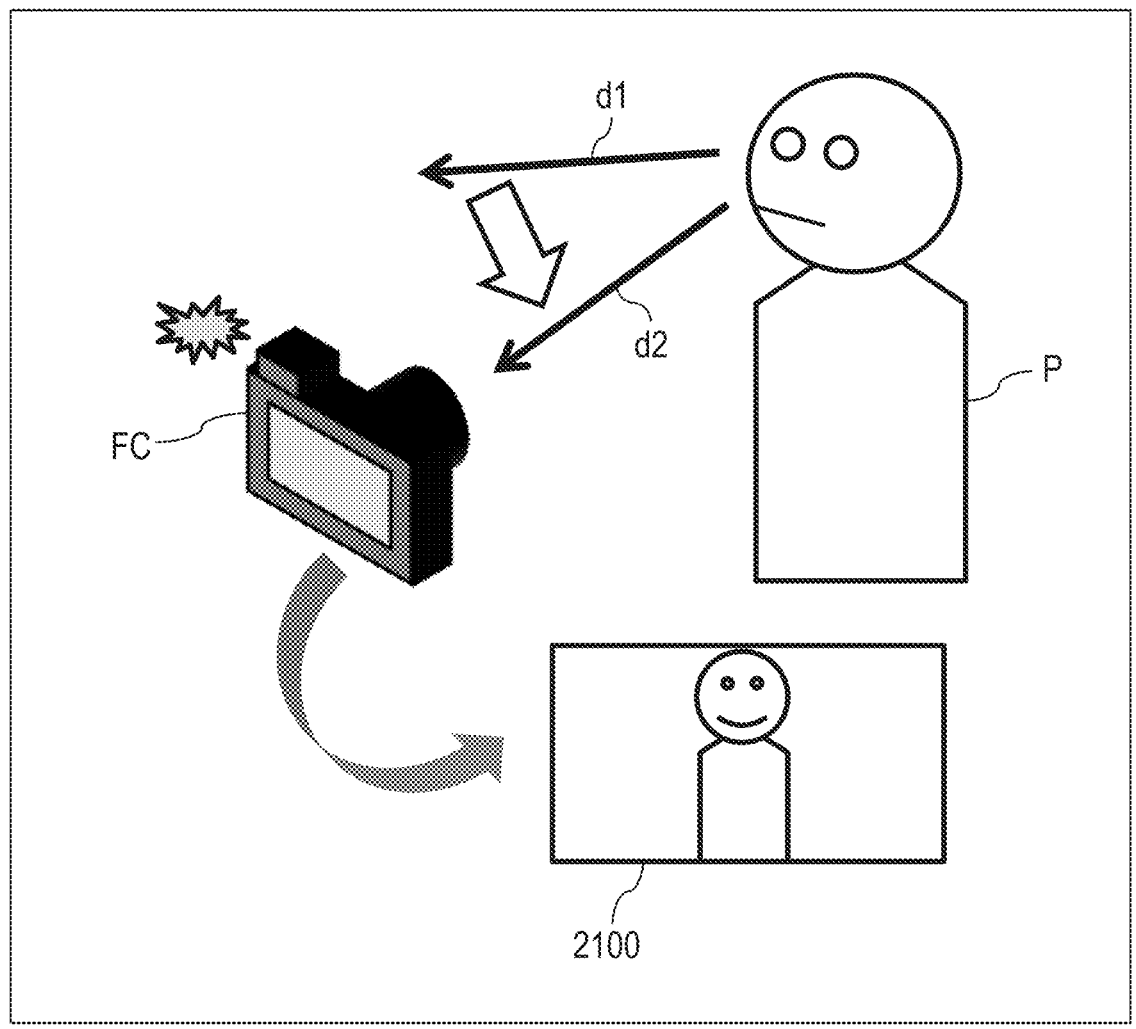
FIG. 21 is a descriptive view of the automatic shutter function of the field cameras FC.

FIG. 21 is a descriptive view of the automatic shutter function of the field cameras FC. The control apparatus 110 refers to the image data from the field camera FC and detects the viewing direction of the player P who is the subject thereof, for example. If the viewing direction of the player P switches from the viewing direction d1 to the viewing direction d2 towards the field camera, the field camera FC engages the shutter and captures still image data 2100 with the player P as the primary subject. As a result, still image data according to a camera perspective by the player P can be automatically attained.

Also, the present embodiment can be applied to cases in which the subject at the end of the viewing direction by the spectator group is a still object that does not move such as products in a row.

Figure 22:
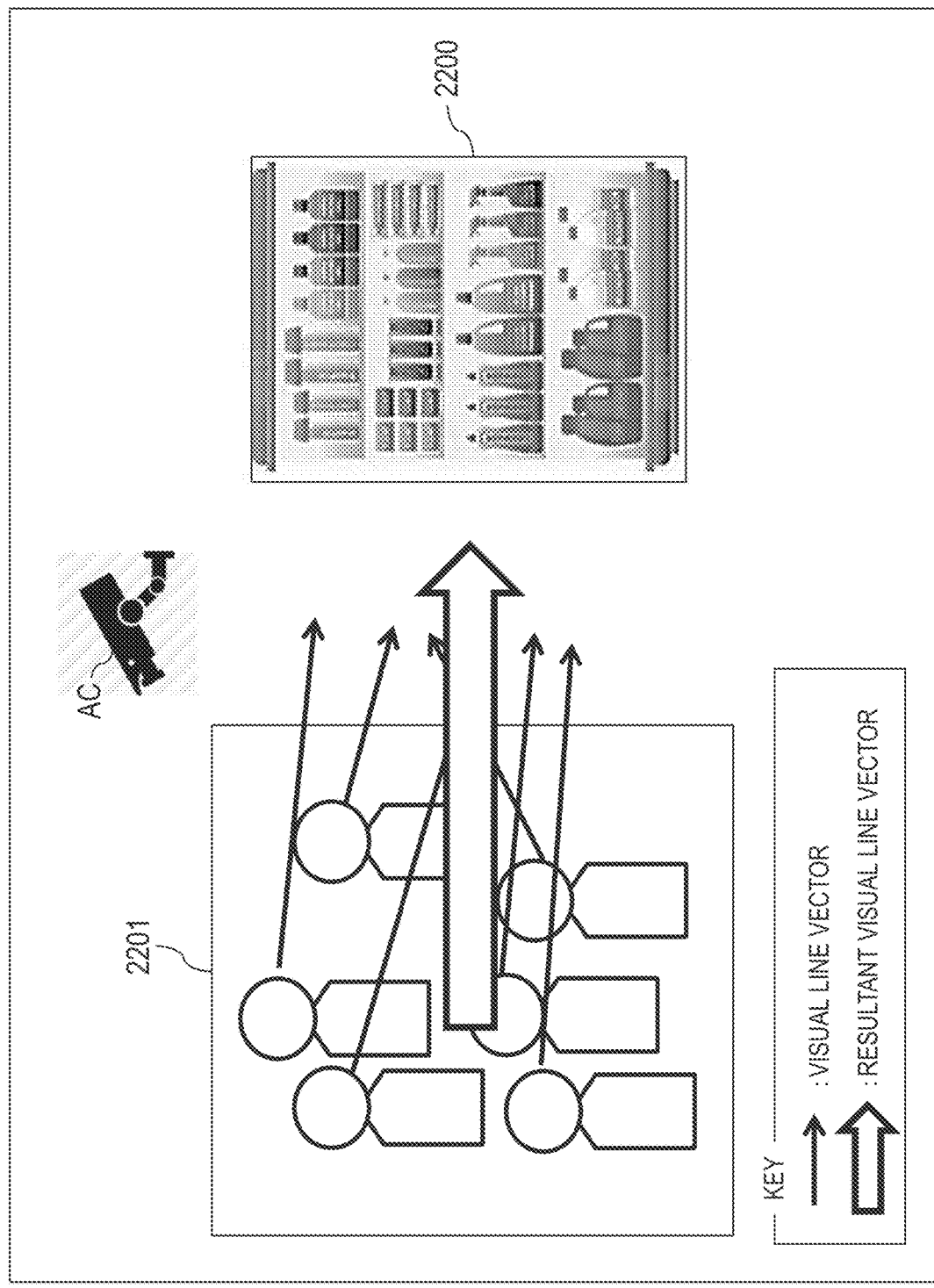
FIG. 22 is a descriptive view showing an example of application to marketing.

FIG. 22 is a descriptive view showing an example of application to marketing. A crowd 2201 focuses on a shelf of products, and the control apparatus 110 images the crowd 2201 using the spectator camera AC, detects a visual line vector indicating the viewing direction of each person in the crowd 2201 from the imaging data, and generates a resultant visual line vector.

The control apparatus 110 identifies a product indicated by the resultant visual line vector among a group of products on a shelf 2200 (hereinafter, "identified product"), and manages various statistical information such as the number of a specific product sold, the number of products sold when indicated by the resultant visual line vector, the number of products sold when not indicated by the resultant visual line vector, and the number of cases in which a product indicated by the resultant visual line vector has not been selected. This is useful for detecting products that garner a high degree of attention and products that garner a low degree of attention.

In the above embodiment, an example was described in which the control apparatus 110 switches between the plurality of the second cameras (field cameras FC), but the control apparatus 110 may instead identify a focus area R using image data of one or more first cameras (spectator cameras AC) or identify a focus subject in the focus area R, and control one second camera (field camera FC). The control unit that controls the second camera (field camera FC) performs control such that the second camera (field camera FC) faces the direction of the identified focus area R or the direction of the focus subject in the identified focus area R.

In the above embodiment, an example was described in which the control apparatus 110 switches between the plurality of field cameras FC, but the control apparatus 110 may instead identify a focus area R using image data of one or more spectator cameras AC or identify a focus subject in the focus area R, and process an image generated by being captured by one field camera FC. The control apparatus 110 identifies a region of a partial image including the identified focus area R or a focus subject in the identified focus area R from the image generated by being captured by the one field camera FC, for example. The control apparatus 110 may then transmit the identified partial image by broadcasting (transmission).

Also, the control apparatus 110 may process an image of a subject in which a first area where spectators are present and a second area where the focus subject is present are captured by one camera. The control apparatus 110 identifies a region of a partial image including the identified focus area by identifying the focus area R or a focus subject in the focus area R from the image generated by being captured by the one camera, for example. The control apparatus 110 may then transmit the identified partial image by broadcasting (transmission).

What is claimed is:

1. A control apparatus configured to be accessible by a plurality of first cameras that capture a first subject of a first area in a facility, and a plurality of second cameras that capture a second subject of a second area in the facility, the control apparatus comprising:
   a detection unit configured to detect a viewing direction of a spectator group in the first subject on the basis of image data of the first subject captured by any one of the plurality of first cameras;
   an identification unit configured to identify a focus area in the second area that is focused on by the spectator group on the basis of the viewing direction of the spectator group detected by the detection unit, and identify a focus subject, focused on by the spectator group, that is present in the focus area on the basis of image data of the second subject captured by each of the plurality of second cameras;
   a determination unit configured to determine a specific second camera to be a transmission source of image data from among the plurality of second cameras on the basis of the focus subject identified by the identification unit;
   a transmission unit configured to transmit image data from the specific second camera determined by the determination unit; and
   a selection unit configured to select a specific first camera from among the plurality of first cameras on the basis of a number of people in the spectator group in the first subject captured by each of the plurality of first cameras,
   wherein the detection unit is configured to detect the viewing direction of a specific spectator group in a specific first subject on the basis of the image data of the specific first subject captured by the specific first camera, and
   wherein the identification unit is configured to identify the focus area of the specific spectator group on the basis of the viewing direction of the specific spectator group detected by the detection unit.

2. The control apparatus according to claim 1, further comprising:
   the selection unit configured to select the specific first camera from among the plurality of first cameras on the basis of a score indicating a number of people in the spectator group in the first subject captured by each of the plurality of first cameras.

3. The control apparatus according to claim 2,
   wherein the selection unit is configured to select the specific first camera on the basis of a positional relationship between the spectator group and the focus area.

4. The control apparatus according to claim 2,
   wherein the selection unit is configured to select, as the specific first camera, a first camera for which the score is greater than or equal to a predetermined threshold.

5. The control apparatus according to claim 2,
wherein the selection unit is configured to select, as the specific first camera, a first camera having a relatively high score among the plurality of first cameras.

6. The control apparatus according to claim 2,
wherein the selection unit is configured to select, as the specific first camera, a first camera for which the score is less than the predetermined threshold.

7. The control apparatus according to claim 6,
wherein the detection unit is configured to detect the viewing direction of a specific spectator in the specific spectator group in the specific first subject on the basis of the image data of the specific first subject captured by the specific first camera, and
wherein the identification unit is configured to identify the focus area of the specific spectator on the basis of the viewing direction of the specific spectator detected by the detection unit.

8. The control apparatus according to claim 7,
wherein the detection unit is configured to select the specific spectator from among remaining spectators other than spectators who are engaging in inattentive behavior among the specific spectator group, on the basis of the image data of the specific first subject, and detect the viewing direction of the specific spectator.

9. The control apparatus according to claim 7,
wherein the control apparatus is configured to be accessible by a database that stores image data pertaining to a distinct person, and
wherein the detection unit is configured to detect the distinct person in the specific spectator group as the specific spectator on the basis of the image data of the specific first subject, and detect the viewing direction of the specific spectator.

10. The control apparatus according to claim 6,
wherein the detection unit is configured to detect the viewing direction of the specific spectator on the basis of an imaging direction of the specific second camera determined by the determination unit and the viewing direction of each individual among the specific spectator group.

11. The control apparatus according to claim 2,
wherein the selection unit is configured to select, as the specific first camera, a first camera having a relatively low score among the plurality of first cameras.

12. The control apparatus according to claim 11,
wherein the detection unit is configured to detect the viewing direction of a specific spectator in the specific spectator group in the specific first subject on the basis of the image data of the specific first subject captured by the specific first camera, and
wherein the identification unit is configured to identify the focus area of the specific spectator on the basis of the viewing direction of the specific spectator detected by the detection unit.

13. The control apparatus according to claim 11,
wherein the detection unit is configured to detect the viewing direction of the specific spectator on the basis of an imaging direction of the specific second camera determined by the determination unit and the viewing direction of each individual among the specific spectator group.

* * * * *